United States Patent
Balasubramanian et al.

(10) Patent No.: US 11,452,043 B2
(45) Date of Patent: Sep. 20, 2022

(54) POWER ENHANCEMENT TECHNIQUES FOR VEHICLE-TO-PEDESTRIAN WIRELESS COMMUNICATION SYSTEMS

(71) Applicant: QUALCOMM Incorporated, San Diego, CA (US)

(72) Inventors: Anantharaman Balasubramanian, San Diego, CA (US); Sudhir Kumar Baghel, Hillsborough, NJ (US); Shailesh Patil, San Diego, CA (US); James Francis Geekie, Carlsbad, CA (US); Farrukh Rashid, San Diego, CA (US); Cheol Hee Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/901,257

(22) Filed: Jun. 15, 2020

(65) Prior Publication Data

US 2020/0404587 A1    Dec. 24, 2020

Related U.S. Application Data

(60) Provisional application No. 62/865,862, filed on Jun. 24, 2019.

(51) Int. Cl.
*H04W 52/02* (2009.01)
*H04W 4/40* (2018.01)
(Continued)

(52) U.S. Cl.
CPC ......... *H04W 52/0235* (2013.01); *H04W 4/40* (2018.02); *H04W 52/0258* (2013.01); *H04W 68/02* (2013.01); *H04W 72/04* (2013.01)

(58) Field of Classification Search
CPC . H04W 52/00; H04W 52/02; H04W 52/0212; H04W 52/0216; H04W 52/0219;
(Continued)

(56) References Cited

U.S. PATENT DOCUMENTS

| | | | |
|---|---|---|---|
| 10,568,029 B2 * | 2/2020 | Uchiyama | H04W 4/70 |
| 2018/0132182 A1 * | 5/2018 | Hanley | H04W 52/0235 |

(Continued)

OTHER PUBLICATIONS

"3rd Generation Partnership Project: Technical Specification Group Services and System Aspects: Service Requirements for V2X Services: Stage 1 (Release 15)", 3GPP Standard, Technical Specification, 3GPP TS 22.185, 3rd Generation Partnership Project (3GPP), Mobile Competence Centre, 650, Route Des Lucioles, F-06921 Sophia-Antipolis Cedex, France, vol. RAN WG1, No. V15.0.0, Jul. 4, 2018 (Jul. 4, 2018), pp. 1-14. XP051474723, 10 pages, [retrieved on Jul. 4, 2018] the whole document.

(Continued)

*Primary Examiner* — Robert C Scheibel
(74) *Attorney, Agent, or Firm* — Danai Nelisile Mhembere; Holland & Hart LLP

(57) ABSTRACT

Methods, systems, and devices for wireless communications are described. A user equipment (UE) may identify a wake up time period corresponding to a wake up cycle, transmit a message that includes an identifier of the UE within a first resource pool during a first portion of the wake up time period based on the wake up cycle, and monitor for a paging signal from a vehicle UE during a paging occasion of the wake up time period based on transmitting the message. A vehicle UE may identify a wake up configuration for a wake up time period, receive, within a first portion of the wake up time period, a message within a resource pool that includes the identifier of the UE. The vehicle UE may transmit a paging signal within a paging occasion of the wake up time period.

30 Claims, 15 Drawing Sheets

(51) Int. Cl.
H04W 68/02 (2009.01)
H04W 72/04 (2009.01)

(58) Field of Classification Search
CPC . H04W 52/0222; H04W 68/00; H04W 68/02; H04W 4/40; H04W 52/0209–0296
See application file for complete search history.

(56) References Cited

U.S. PATENT DOCUMENTS

| | | | |
|---|---|---|---|
| 2018/0262865 A1* | 9/2018 | Lepp | H04W 52/0235 |
| 2020/0053647 A1* | 2/2020 | Chae | H04W 72/0446 |
| 2020/0053704 A1* | 2/2020 | Kim | H04B 7/0617 |
| 2020/0068531 A1* | 2/2020 | Sundberg | H04W 72/0453 |

OTHER PUBLICATIONS

Apple: "Considerations on NR V2X Mode 2 Resource Allocation Mechanism", 3GPP Draft, 3GPP TSG RAN WG1 #97, R1-1907335, Considerations on NR V2X Mode 2 Resource Allocation Mechanism, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728774, 6 pages, Retrieved from the Internet: URL: http://www.3gpp.org/ftp/Meetings%5F3GPP%5FSYNC/RAN1/Docs/R1%2D1907335%2Ezip. [retrieved on May 13, 2019] the whole document.

Intel Corporation: "In-Device Coexistence Issues for EV2X Communication", 3GPP Draft, 3GPP TSG RAN WG1 Meeting #97, R1-1906798, Intel—EV2X COEX, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728249, 8 pages, Retrieved from the Internet: URL: http://www.3gpp.org/ftp/Meetings%5F3GPP%5FSYNC/RAN1/Docs/R1%2D1906798%2Ezip. [retrieved on May 13, 2019] the whole document.

Intel Corporation: "Introduction of DRX Over PC5", 3GPP Draft, 3GPP TSG RAN WG2 Meeting #95bis, R2-166255, 3rd Generation Partnership Project (3GPP), Mobile Competence Centre, 650, Route Des Lucioles, F-06921 Sophia-Antipolis Cedex, France, vol. RAN WG2, No. Kaohsiung, Oct. 10, 2016-Oct. 14, 2016, Oct. 9, 2016 (Oct. 9, 2016), XP051150850, 2 pages, Retrieved from the Internet: URL: http://www.3gpp.org/ftp/Meetings_3GPP_SYNC/RAN2/Docs/. [retrieved on Oct. 9, 2016] the whole document.

International Search Report and Written Opinion—PCT/US2020/037932—ISA/EPO—dated Oct. 1, 2020.

Qualcomm Views Qualcomm Technologies Incorporated All Rights Reserved: "V2X Evolution for Rel-17 Qualcomm Views", 3GPP Draft, RP-190839, CV2X-R17-QCOM, 3rd Generation Partnership Project (3GPP), Mobile Competence Centre, 650, Route Des Lucioles, F-06921 Sophia-Antipolis Cedex, France, vol. RAN WG1, No. Newport Beach, Jun. 3, 2019-Jun. 6, 2019, Jun. 2, 2019 (Jun. 2, 2019), XP051746123, 9 pages, Retrieved from the Internet: URL: http://www.3gpp.org/ftp/Meetings%5F3GPP%5FSYNC/RAN/Docs/RP%2D190839%2Ezip. [retrieved on Jun. 2, 2019] the whole document.

ZTE: "Discussion on PC5 DRX", 3GPP Draft, 3GPP TSG-RAN WG2 Meeting #98, R2-1704634, Discussion on PC5 DRX, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 14, 2017 (May 14, 2017), XP051275179, 4 pages, Retrieved from the Internet: URL: http://www.3gpp.org/ftp/Meetings_3GPP_SYNC/RAN2/Docs/. [retrieved on May 14, 2017] the whole document.

* cited by examiner

POWER ENHANCEMENT TECHNIQUES FOR VEHICLE-TO-PEDESTRIAN WIRELESS COMMUNICATION SYSTEMS

CROSS REFERENCE

The present Application for Patent claims the benefit of U.S. Provisional Patent Application No. 62/865,862 by BALASUBRAIVIANIAN et al., entitled "POWER ENHANCEMENT TECHNIQUES FOR VEHICLE-TO-PEDESTRIAN WIRELESS COMMUNICATION SYSTEMS," filed Jun. 24, 2019, assigned to the assignee hereof, and expressly incorporated by reference herein.

FIELD OF TECHNOLOGY

The following relates generally to wireless communications and more specifically to power enhancement techniques for vehicle-to-pedestrian (V2P) wireless communication systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices. Some wireless communications systems may support direct communications between multiple communication devices. Examples of direct communications may include, but are not limited to, device-to-device (D2D) communications, vehicle-based communications, which may also be referred to as V2P networks, vehicle-to-everything (V2X) networks, vehicle-to-vehicle (V2V) networks, cellular V2X (C-V2X) networks, and the like. As demand for communication efficiency increases, some wireless communications systems may fail to provide satisfactory power management, and therefore improved techniques are desired.

SUMMARY

The described techniques relate to improved methods, systems, devices, and apparatuses that support power enhancement techniques for vehicle-to-pedestrian (V2P) wireless communications systems. Generally, the described techniques provide for improvements to pedestrian safety in V2P wireless communications systems, as well as improvements to direct communications between user equipments (UEs) in the V2P wireless communications system via sidelink connections, such as via a PC5 interface. For example, the described techniques may enable UEs (e.g., pedestrian UEs (P-UEs)) to experience power savings by reducing power consumption relating to PC5 interface operations. The described techniques may achieve the benefits described herein by configuring a common PC5 wake up cycle for all P-UEs or a P-UE specific wake up cycle in a V2P wireless communication systems.

A P-UE may identify a wake up time period corresponding to a wake up cycle, and transmit messages (e.g., pedestrian-to-vehicle (P2V) messages) that includes an identifier of the P-UE within a resource pool during a portion of the wake up time period, and monitor for a paging message from a vehicle UE (V-UE) during a paging occasion of the wake up time period. In some cases, a P-UE may identify a paging occasion for a radio access technology (RAT) that may be different from a paging occasion of a sidelink RAT, and transmit, via the sidelink RAT, a message that includes an identifier of the P-UE during a portion of the wake up time period positioned relative to the paging occasion of the RAT. The P-UE may therefore, monitor during a different portion of the wake up time period for a collision warning message from the V-UE. The described techniques may therefore include features for reduced power consumption, improved reliability for D2D communications, such as V2P communications, and may promote low latency for D2D communications, among other benefits.

A method of wireless communication by a UE is described. The method may include identifying a wake up time period corresponding to a wake up cycle, transmitting a message that includes an identifier of the UE within a first resource pool during a first portion of the wake up time period based on the wake up cycle, and monitoring for a paging signal from a vehicle UE during a paging occasion of the wake up time period based on transmitting the message.

An apparatus for wireless communication is described. The apparatus may include a processor, memory coupled with the processor, and instructions stored in the memory. The instructions may be executable by the processor to cause the apparatus to identify a wake up time period corresponding to a wake up cycle, transmit a message that includes an identifier of the apparatus within a first resource pool during a first portion of the wake up time period based on the wake up cycle, and monitor for a paging signal from a vehicle UE during a paging occasion of the wake up time period based on transmitting the message.

Another apparatus for wireless communication is described. The apparatus may include means for identifying a wake up time period corresponding to a wake up cycle, transmitting a message that includes an identifier of the apparatus within a first resource pool during a first portion of the wake up time period based on the wake up cycle, and monitoring for a paging signal from a vehicle UE during a paging occasion of the wake up time period based on transmitting the message.

A non-transitory computer-readable medium storing code for wireless communication by a UE is described. The code may include instructions executable by a processor to identify a wake up time period corresponding to a wake up cycle, transmit a message that includes an identifier of the UE within a first resource pool during a first portion of the wake up time period based on the wake up cycle, and monitor for a paging signal from a vehicle UE during a paging occasion of the wake up time period based on transmitting the message.

Some examples of the method, apparatuses, and non-transitory computer-readable medium described herein may further include operations, features, means, or instructions for receiving the paging signal during the paging occasion, and monitoring, during a second portion of the wake up time period that occurs relative to the first portion, a second resource pool within the wake up time period for a collision warning message from the vehicle UE based on receiving the paging signal.

In some examples of the method, apparatuses, and non-transitory computer-readable medium described herein, monitoring the second resource pool may include operations, features, means, or instructions for receiving the collision warning message that includes the identifier of the UE, and presenting an alert based on receiving the collision warning message.

Some examples of the method, apparatuses, and non-transitory computer-readable medium described herein may further include operations, features, means, or instructions for receiving the collision warning message that includes an identifier of second UE that may be different than the UE, and discarding the collision warning message.

Some examples of the method, apparatuses, and non-transitory computer-readable medium described herein may further include operations, features, means, or instructions for entering a low power state beginning after an end of the wake up time period that extends until a subsequent wake up time period.

Some examples of the method, apparatuses, and non-transitory computer-readable medium described herein may further include operations, features, means, or instructions for entering a low power state beginning at a second portion of the wake up time period that extends until a subsequent wake up time period based on determining that the paging signal was not received during the paging occasion within the wake up time period.

In some examples of the method, apparatuses, and non-transitory computer-readable medium described herein, transmitting the message may include operations, features, means, or instructions for performing a clear channel assessment procedure to determine a resource block for transmission within the first resource pool, and transmitting the message within the resource block based on a result of the clear channel assessment procedure.

In some examples of the method, apparatuses, and non-transitory computer-readable medium described herein, transmitting the message may include operations, features, means, or instructions for transmitting the message including the identifier that may be a pseudo identifier of the UE.

In some examples of the method, apparatuses, and non-transitory computer-readable medium described herein, transmitting the message may include operations, features, means, or instructions for transmitting the message including location data of the UE, sensor data of the UE, trajectory data of the UE, or any combination thereof.

In some examples of the method, apparatuses, and non-transitory computer-readable medium described herein, transmitting the message may include operations, features, means, or instructions for transmitting the message via a sidelink channel using a sidelink interface of the UE.

In some examples of the method, apparatuses, and non-transitory computer-readable medium described herein, identifying the wake up time period may include operations, features, means, or instructions for receiving a wake up configuration that indicates the wake up time period and the wake up cycle.

In some examples of the method, apparatuses, and non-transitory computer-readable medium described herein, the first portion of the wake up time period occurs before or after a second portion of the wake up time period.

A method of wireless communication by a vehicle UE is described. The method may include identifying a wake up configuration for a wake up time period, receiving, within a first portion of the wake up time period, a message within a first resource pool that includes an identifier of a first UE and at least one of location data of the first UE, sensor data of the first UE, or trajectory data of the first UE based on the wake up configuration, and transmitting a paging signal within a paging occasion of the wake up time period based on at least one of the location data, the sensor data, or the trajectory data.

An apparatus for wireless communication is described. The apparatus may include a processor, memory coupled with the processor, and instructions stored in the memory. The instructions may be executable by the processor to cause the apparatus to identify a wake up configuration for a wake up time period, receive, within a first portion of the wake up time period, a message within a first resource pool that includes an identifier of a first UE and at least one of location data of the first UE, sensor data of the first UE, or trajectory data of the first UE based on the wake up configuration, and transmit a paging signal within a paging occasion of the wake up time period based on at least one of the location data, the sensor data, or the trajectory data.

Another apparatus for wireless communication is described. The apparatus may include means for identifying a wake up configuration for a wake up time period, receiving, within a first portion of the wake up time period, a message within a first resource pool that includes an identifier of a first UE and at least one of location data of the first UE, sensor data of the first UE, or trajectory data of the first UE based on the wake up configuration, and transmitting a paging signal within a paging occasion of the wake up time period based on at least one of the location data, the sensor data, or the trajectory data.

A non-transitory computer-readable medium storing code for wireless communication by a vehicle UE is described. The code may include instructions executable by a processor to identify a wake up configuration for a wake up time period, receive, within a first portion of the wake up time period, a message within a first resource pool that includes an identifier of a first UE and at least one of location data of the first UE, sensor data of the first UE, or trajectory data of the first UE based on the wake up configuration, and transmit a paging signal within a paging occasion of the wake up time period based on at least one of the location data, the sensor data, or the trajectory data.

Some examples of the method, apparatuses, and non-transitory computer-readable medium described herein may further include operations, features, means, or instructions for transmitting or receiving the wake up configuration that indicates a timing reference of the wake up time period, a periodicity of the wake up time period, or both.

Some examples of the method, apparatuses, and non-transitory computer-readable medium described herein may further include operations, features, means, or instructions for generating a prediction that the vehicle UE may be on a collision course with the first UE based on the message, where the paging signal may be transmitted within the paging occasion of the wake up time period based on the prediction.

Some examples of the method, apparatuses, and non-transitory computer-readable medium described herein may further include operations, features, means, or instructions for transmitting a collision warning message including the identifier of the first UE within a second resource pool during a second portion of the wake up time period that occurs relative to the paging occasion based on the prediction.

Some examples of the method, apparatuses, and non-transitory computer-readable medium described herein may further include operations, features, means, or instructions for altering a speed of a vehicle that includes the vehicle UE, a trajectory of the vehicle, or both, based on the prediction.

Some examples of the method, apparatuses, and non-transitory computer-readable medium described herein may further include operations, features, means, or instructions for generating an alert based on the prediction.

Some examples of the method, apparatuses, and non-transitory computer-readable medium described herein may further include operations, features, means, or instructions for receiving, within a first portion of a second wake up time period, a second message within a first resource pool that includes an identifier of a second UE and location data of the second UE, generating a prediction that the vehicle UE may be not on a collision course with the second UE based on the second message, and determining not to transmit the paging signal within a second paging occasion of the second wake up time period based on the prediction.

Some examples of the method, apparatuses, and non-transitory computer-readable medium described herein may further include operations, features, means, or instructions for receiving a set of messages that includes a set of identifiers for a set of UEs, and generating a prediction that the vehicle UE may be on a collision course with at least one UE of the set of UEs based on the set of messages, where the paging signal may be transmitted within the paging occasion of the wake up time period based on the prediction.

Some examples of the method, apparatuses, and non-transitory computer-readable medium described herein may further include operations, features, means, or instructions for transmitting, during a second portion of the wake up time period that occurs relative to the paging occasion, a collision warning message including an identifier of the at least one UE based on the prediction.

Some examples of the method, apparatuses, and non-transitory computer-readable medium described herein may further include operations, features, means, or instructions for receiving, within a first portion of a second wake up time period, a set of messages that includes a set of identifiers for a set of UEs, generating a prediction that the vehicle UE may be not on a collision course with any of the set of UEs based on the set of messages, and determining not to transmit the paging signal within a second paging occasion of the second wake up time period based on the prediction.

In some examples of the method, apparatuses, and non-transitory computer-readable medium described herein, receiving the message may include operations, features, means, or instructions for receiving the message including the identifier that may be a pseudo identifier of the first UE.

In some examples of the method, apparatuses, and non-transitory computer-readable medium described herein, receiving the message may include operations, features, means, or instructions for receiving the message via a sidelink channel using a sidelink interface of the UE.

In some examples of the method, apparatuses, and non-transitory computer-readable medium described herein, the first portion of the wake up time period occurs before or after a second portion of the wake up time period.

A method of wireless communications by a UE is described. The method may include identifying a paging occasion for a first RAT that is different than a paging occasion of a sidelink RAT, transmitting, via the sidelink RAT, a message that includes an identifier of the UE during a first portion of a wake up time period positioned relative to the paging occasion of the first RAT, and monitoring, during a second portion of the wake up time period that occurs relative to the first portion, for a collision warning message from a vehicle UE that includes the identifier of the UE.

An apparatus for wireless communications is described. The apparatus may include a processor, memory coupled with the processor, and instructions stored in the memory. The instructions may be executable by the processor to cause the apparatus to identify a paging occasion for a first RAT that is different than a paging occasion of a sidelink RAT, transmit, via the sidelink RAT, a message that includes an identifier of the apparatus during a first portion of a wake up time period positioned relative to the paging occasion of the first RAT, and monitor, during a second portion of the wake up time period that occurs relative to the first portion, for a collision warning message from a vehicle UE that includes the identifier of the apparatus.

Another apparatus for wireless communications is described. The apparatus may include means for identifying a paging occasion for a first RAT that is different than a paging occasion of a sidelink RAT, transmitting, via the sidelink RAT, a message that includes an identifier of the apparatus during a first portion of a wake up time period positioned relative to the paging occasion of the first RAT, and monitoring, during a second portion of the wake up time period that occurs relative to the first portion, for a collision warning message from a vehicle UE that includes the identifier of the apparatus.

A non-transitory computer-readable medium storing code for wireless communications by a UE is described. The code may include instructions executable by a processor to identify a paging occasion for a first RAT that is different than a paging occasion of a sidelink RAT, transmit, via the sidelink RAT, a message that includes an identifier of the UE during a first portion of a wake up time period positioned relative to the paging occasion of the first RAT, and monitor, during a second portion of the wake up time period that occurs relative to the first portion, for a collision warning message from a vehicle UE that includes the identifier of the UE.

Some examples of the method, apparatuses, and non-transitory computer-readable medium described herein may further include operations, features, means, or instructions for transmitting paging cycle information that indicates a paging cycle of the wake up time period.

In some examples of the method, apparatuses, and non-transitory computer-readable medium described herein, transmitting the message may include operations, features, means, or instructions for transmitting the message including a location data of the UE, trajectory data of the UE, sensor data of the UE, or any combination thereof.

Some examples of the method, apparatuses, and non-transitory computer-readable medium described herein may further include operations, features, means, or instructions for receiving the collision warning message that includes the identifier of the UE, and presenting an alert based on the collision warning message.

Some examples of the method, apparatuses, and non-transitory computer-readable medium described herein may further include operations, features, means, or instructions for receiving the collision warning message that includes an identifier of second UE that may be different from the UE, and discarding the collision warning message.

Some examples of the method, apparatuses, and non-transitory computer-readable medium described herein may further include operations, features, means, or instructions for entering a low power state beginning after an end of the wake up time period that extends until a subsequent wake up time period.

Some examples of the method, apparatuses, and non-transitory computer-readable medium described herein may further include operations, features, means, or instructions for identifying a configured delay between an end of the paging occasion of the first RAT and a beginning of the wake up time period for the sidelink RAT.

In some examples of the method, apparatuses, and non-transitory computer-readable medium described herein, the first RAT may be a Long Term Evolution RAT or a New Radio (NR) RAT.

In some examples of the method, apparatuses, and non-transitory computer-readable medium described herein, transmitting the message may include operations, features, means, or instructions for transmitting the message via a sidelink channel using the sidelink RAT of the UE.

In some examples of the method, apparatuses, and non-transitory computer-readable medium described herein, transmitting the message may include operations, features, means, or instructions for transmitting the message including the identifier that may be a pseudo identifier of the UE.

In some examples of the method, apparatuses, and non-transitory computer-readable medium described herein, the first portion of the wake up time period may be aligned with, partially aligned with, occurs before, or occurs after, the paging occasion of the first RAT.

In some examples of the method, apparatuses, and non-transitory computer-readable medium described herein, the first portion of the wake up time period occurs before or after the second portion of the wake up time period.

A method of wireless communications by a vehicle UE is described. The method may include receiving, from a first UE, paging cycle information that indicates a paging cycle of a wake up time period for a sidelink RAT relative to a paging occasion configured for the first UE by a first RAT, receiving a message that includes an identifier of the first UE during a first portion of the wake up time period that occurs relative to the paging occasion of the first RAT, and transmitting a collision warning message during a second portion of the wake up time period that occurs relative to the first portion based on the message.

An apparatus for wireless communications is described. The apparatus may include a processor, memory coupled with the processor, and instructions stored in the memory. The instructions may be executable by the processor to cause the apparatus to receive, from a first UE, paging cycle information that indicates a paging cycle of a wake up time period for a sidelink RAT relative to a paging occasion configured for the first UE by a first RAT, receive a message that includes an identifier of the first UE during a first portion of the wake up time period that occurs relative to the paging occasion of the first RAT, and transmit a collision warning message during a second portion of the wake up time period that occurs relative to the first portion based on the message.

Another apparatus for wireless communications is described. The apparatus may include means for receiving, from a first UE, paging cycle information that indicates a paging cycle of a wake up time period for a sidelink RAT relative to a paging occasion configured for the first UE by a first RAT, receiving a message that includes an identifier of the first UE during a first portion of the wake up time period that occurs relative to the paging occasion of the first RAT, and transmitting a collision warning message during a second portion of the wake up time period that occurs relative to the first portion based on the message.

A non-transitory computer-readable medium storing code for wireless communications by a vehicle UE is described. The code may include instructions executable by a processor to receive, from a first UE, paging cycle information that indicates a paging cycle of a wake up time period for a sidelink RAT relative to a paging occasion configured for the first UE by a first RAT, receive a message that includes an identifier of the first UE during a first portion of the wake up time period that occurs relative to the paging occasion of the first RAT, and transmit a collision warning message during a second portion of the wake up time period that occurs relative to the first portion based on the message.

In some examples of the method, apparatuses, and non-transitory computer-readable medium described herein, receiving the message may include operations, features, means, or instructions for receiving the message including a location data of the first UE, trajectory data of the first UE, sensor data of the first UE, or any combination.

Some examples of the method, apparatuses, and non-transitory computer-readable medium described herein may further include operations, features, means, or instructions for generating a prediction that the vehicle UE may be on a collision course with the first UE based on the message, where the collision warning message includes the identifier of the first UE and may be transmitted based on the prediction.

Some examples of the method, apparatuses, and non-transitory computer-readable medium described herein may further include operations, features, means, or instructions for altering a speed of a vehicle that includes the vehicle UE, a trajectory of the vehicle, or both, based on the prediction.

Some examples of the method, apparatuses, and non-transitory computer-readable medium described herein may further include operations, features, means, or instructions for identifying a configured delay between an end of the paging occasion of the first RAT and a beginning of the wake up time period of the sidelink RAT.

Some examples of the method, apparatuses, and non-transitory computer-readable medium described herein may further include operations, features, means, or instructions for receiving second paging cycle information that indicates a second paging cycle of a second wake up time period relative to a second paging occasion of the first RAT configured for a second UE, the second wake up time period being offset in time relative to the wake up time period, receiving, during a first portion of the second wake up time period that occurs relative to the second paging occasion of the first RAT, a second message that includes an identifier of the second UE, and transmitting, during a second portion of the second wake up time period that occurs relative to the first portion, a second collision warning message based on the second message.

In some examples of the method, apparatuses, and non-transitory computer-readable medium described herein, the first RAT may be a Long Term Evolution RAT or a NR RAT.

In some examples of the method, apparatuses, and non-transitory computer-readable medium described herein, receiving the message may include operations, features, means, or instructions for receiving the message via a sidelink channel using the sidelink RAT.

In some examples of the method, apparatuses, and non-transitory computer-readable medium described herein, receiving the message may include operations, features, means, or instructions for receiving the message including the identifier that may be a pseudo identifier of the first UE.

In some examples of the method, apparatuses, and non-transitory computer-readable medium described herein, the first portion of the wake up time period may be aligned with, partially aligned with, occurs before, or occurs after, the paging occasion of the first RAT.

In some examples of the method, apparatuses, and non-transitory computer-readable medium described herein, the first portion of the wake up time period occurs before or after the second portion of the wake up time period.

DETAILED DESCRIPTION

Figure 1:
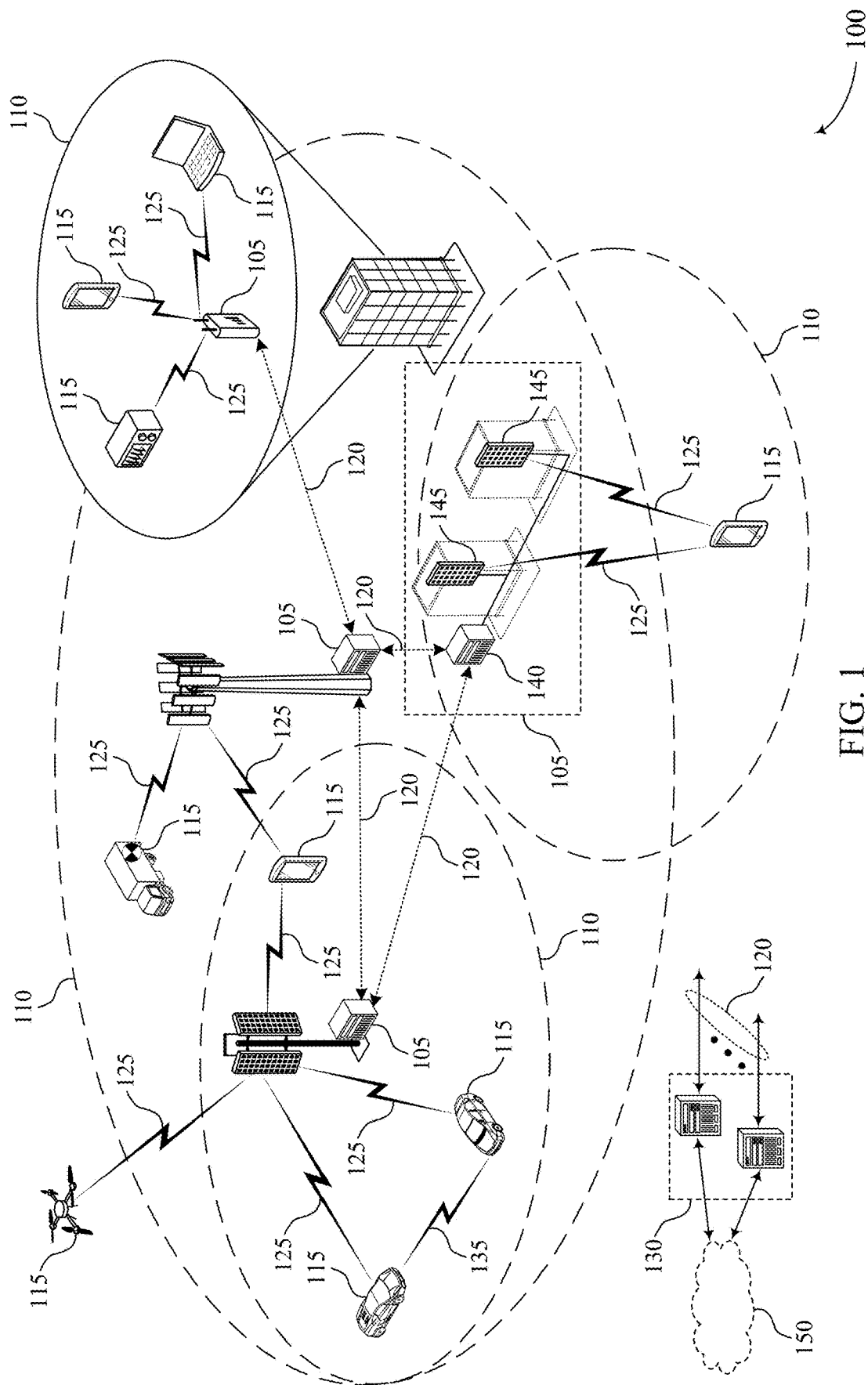
FIGS. 1 and 2 illustrate examples of a wireless communications system in accordance with aspects of the present disclosure.

Some wireless communication systems may support direct communications between multiple communication devices, which in some examples may include a user equipment (UE). Examples of direct communications may include device-to-device (D2D) communications, which may include vehicle-based communications, such as for example in vehicle-to-pedestrian (V2P) wireless communication systems, and the like. In V2P wireless communication systems, D2D communications may occur between a vehicle (also referred to as "V-UE") and a UE carried by a pedestrian (also referred to as "P-UE"). Direct communications between a V-UE and P-UE may occur over a direct connection, which may be a sidelink connection, such as via a PC5 interface. V-UEs and P-UEs may therefore exchange information via V2P messages and pedestrian-to-vehicle (P2V) messages using the PC5 interface.

Some vehicle-based wireless communication systems may have shortcomings in addressing road safety, and more specifically, in improving pedestrian safety via direct communications. In some examples, to address pedestrian safety, P-UEs may continuously monitor a sidelink (e.g., PC5 interface) for messages (e.g., warning messages) from V-UEs. However, continuous monitoring of the sidelink by the P-UEs may result in increased power consumption by P-UEs (e.g., due to the PC5 interface receive circuitry operating nonstop). Due to finite resources (e.g., battery life) of P-UEs, improving pedestrian safety in V2P wireless communication systems may be challenging. Therefore, as demand for communication efficiency and improvements to pedestrian safety in V2P wireless communication systems increases, improvements to power management for P-UEs may be desired.

A P-UE may identify a wake up time period corresponding to a wake up cycle, and transmit messages (e.g., pedestrian-to-vehicle (P2V) messages) that includes an identifier of the P-UE within a resource pool during a portion of the wake up time period, and monitor for a paging message from a vehicle UE (V-UE) during a paging occasion of the wake up time period. In some cases, a P-UE may identify a paging occasion for a radio access technology (RAT) that may be different from a paging occasion of a sidelink RAT, and transmit, via the sidelink RAT, a message that includes an identifier of the P-UE during a portion of the wake up time period positioned relative to the paging occasion of the RAT.

Aspects of the subject matter described herein may be implemented to realize one or more advantages. The described techniques may support improvements in power savings, among other advantages. As such, supported techniques may include improved UE operations and may promote UE efficiencies, among other benefits in V2P wireless communications systems. Aspects of the disclosure are initially described in the context of a wireless communications system. Aspects of the disclosure are then illustrated by and described with reference to a V2P wireless communications system, a P-UE common wake up cycle, one or more P-UE specific wake up cycles, and process flow that relate to power enhancement techniques in V2P wireless communications systems. Aspects of the disclosure are further illustrated by and described with reference to apparatus diagrams, system diagrams, and flowcharts that relate to power enhancement (e.g., power optimization) techniques in V2P wireless communications systems.

FIG. 1 illustrates an example of a wireless communications system 100 in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, or base stations 105, or network equipment (e.g., core network nodes, relay devices, integrated access and backhaul (IAB) nodes, or other network equipment), or any combination thereof, as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 or UEs 115, or both, that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $\Delta_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells (e.g., a macro cell, a small cell, a hot spot, or other types of cells, or various combinations thereof). The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both. In some examples, UEs 115 may be P-UEs 115 or V-UEs 115, or a combination thereof.

A P-UE 115 may identify a wake up time period corresponding to a wake up cycle, and transmit messages (e.g., P2V messages) that includes an identifier of the P-UE 115 within a resource pool during a portion of the wake up time period, and monitor for a paging message from a V-UE 115 during a paging occasion of the wake up time period. In some cases, a P-UE 115 may identify a paging occasion for a RAT that may be different from a paging occasion of a sidelink RAT, and transmit, via the sidelink RAT a message that includes an identifier of the P-UE 115 during a portion of the wake up time period positioned relative to the paging occasion of the RAT.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW)

communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission or reception, or both, by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
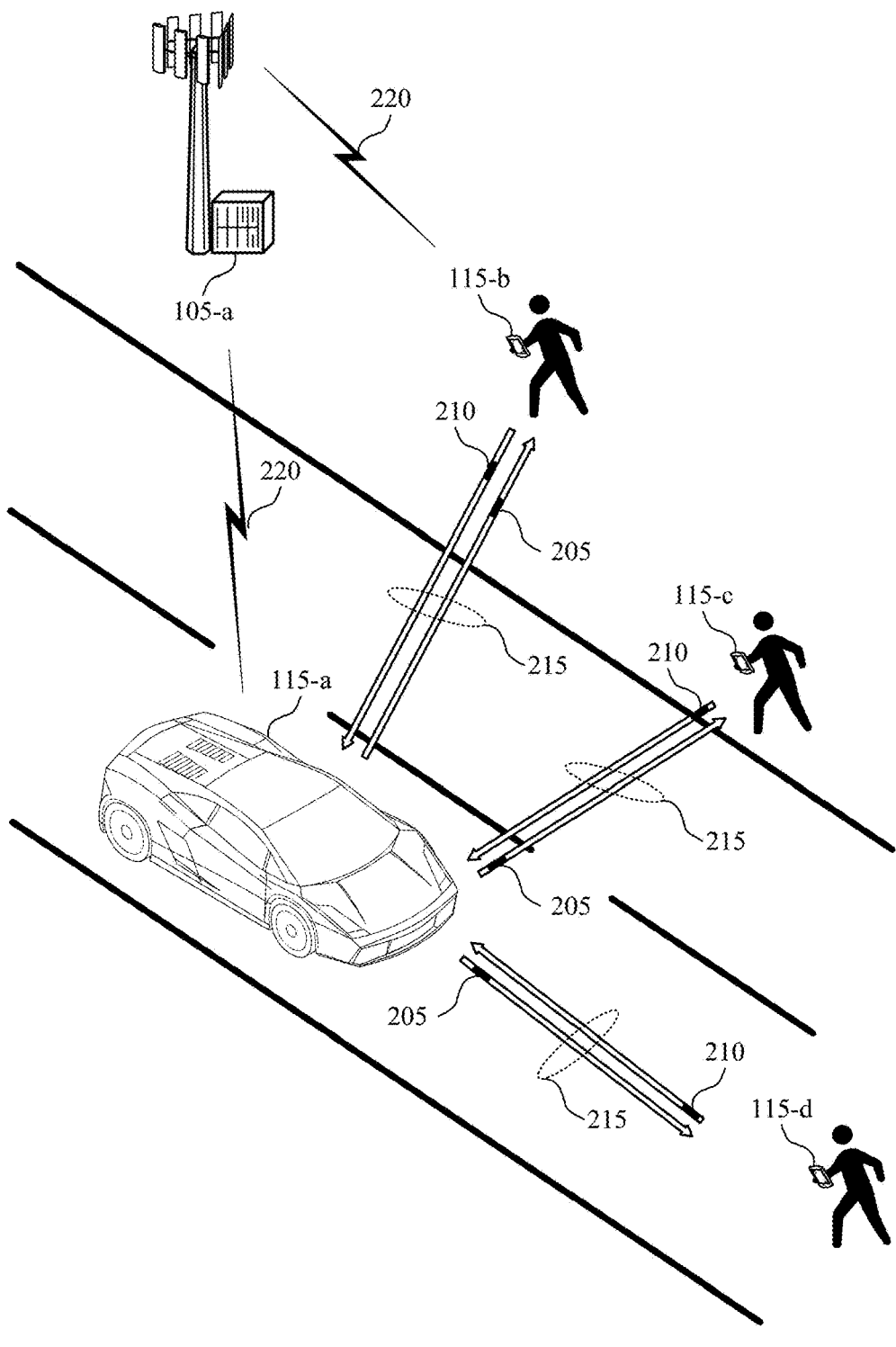

FIG. 2 illustrates an example of a V2P wireless communications system 200 in accordance with aspects of the present disclosure. The V2P wireless communications system 200 may include multiple UEs 115, which may be examples of the corresponding devices described with reference to FIG. 1.

In the illustrated example, base stations 105-*a* may wirelessly communicate with one or more vehicles (e.g., UE 115-*a*) or one or more pedestrians (e.g., UE 115-*b*, etc.), or any combination of vehicles and pedestrians, via one or more communication links 220.

In some examples, UE 115-*a* may be a V-UE while UE 115-*b*, UE 115-*c* and UE 115-*d* may be P-UEs (e.g., UEs carried by pedestrians). In some examples, the V2P wireless communications system 200 may implement aspects of the wireless communications system 100. For example, UEs 115 in the V2P wireless communications system 200 may address road safety, and more specifically, improve pedestrian safety via direct communications between UEs 115 in the V2P wireless communication systems 200 by exchanging information. For example, V2P messages 205 and P2V messages 210 via PC5 interfaces 215).

In some examples, to experience these benefits (e.g., road safety, pedestrian safety), UEs 115 in the V2P wireless communications system 200 may support improvements to UE 115 power usage (e.g., minimizing or optimizing power consumption), among other advantages. For UEs 115 to experience advantages such as power improvements, UEs 115 may, in some examples, configure one or more operational modifications to provide improved PC5 power operation for UEs 115. One or more operational modifications may include operating according to a UE common wake up cycle (also referred to as "common PC5 wake up cycle") or a UE specific wake up cycle (also referred to as "specific PC5 wake up cycle"). In some examples, UEs 115 may receive a wake up configuration for a wake up time and a wake up cycle from base station 105-*a*. An exemplary wake up cycle is further described in more detail herein with reference to FIG. 3

Figure 3:
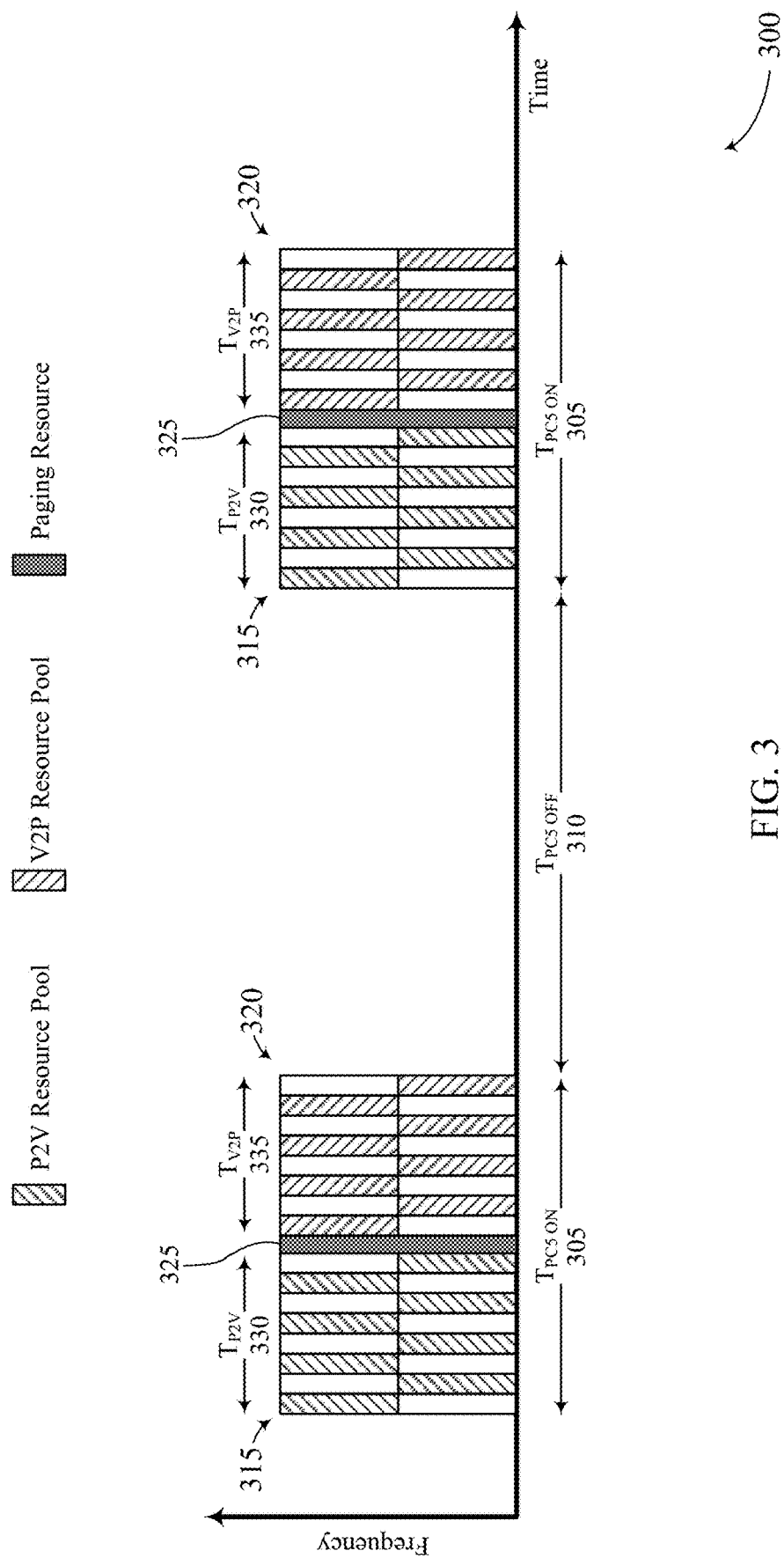
FIG. 3 illustrates an example of a pedestrian user equipment (P-UE) common wake up cycle in accordance with aspects of the present disclosure.

FIG. 3 illustrates an example of a P-UE common wake up cycle 300 in accordance with aspects of the present disclosure. The P-UE common wake up cycle 300 may implement aspects of wireless communications system 100 and V2P wireless communications system 200, as described with reference to FIGS. 1 and 2. For example, the P-UE common wake up cycle 300 may be based on a configuration by a base station 105, and implemented by a UE 115 for activating and deactivating a PC5 interface to support robustness for PC5 interface operation and improvement in power management relating to PC5 interface operation, among other advantages.

The P-UE common wake up cycle 300 may include, for example, an ON duration 305 (also referred to as $T_{PC5_{ON}}$), which may be configured according to a common time reference (e.g., a frame, a subframe, a slot) in which UEs 115 (e.g., P-UEs 115, V-UEs 115) power ON their corresponding PC5 interface (e.g., sidelink connection) for the ON duration 305. In some examples, UEs 115 may power ON their corresponding PC5 interface synchronously. Additionally, the common wake up cycle 300 may include an OFF duration 310 (also referred to as "$T_{PC5_{OFF}}$ duration 310"), which may be configured according to a common time reference in which UEs 115 (e.g., P-UEs 115, V-UEs 115) power OFF their corresponding PC5 interface for the OFF duration 310. Similarly, UEs 115 may power OFF their corresponding PC5 interface synchronously. For example, UEs 115 may power OFF their corresponding PC5 interface simultaneously. UEs 115 may cycle between being in an active mode during ON durations 305 and a low power state during OFF durations 310 in accordance with the common wake up cycle 300.

The P-UE common wake up cycle 300 may include time and frequency resources relating to direct communications, such as V2P and P2V communications. For example, ON duration 305 may correspond to time and frequency resources for direct communications, which may include resource elements (REs), physical resource blocks (PRBs), and the like. The time and frequency resources may, in some examples, relate to multiple resource pools for UEs 115. In some examples, different resource pools may be configured for different UE-types. For example, there may be separate resource pools for pedestrian (e.g., P-UEs 115) to vehicle (e.g., V-UEs 115) communications, and vehicle (e.g., V-UEs 115) to pedestrian (e.g., P-UEs 115) communications.

In FIG. 3, resource pool 315 for P-UEs 115 may include time and frequency resources for P-UEs 115 to transmit information to V-UEs 115. P-UEs 115 may use time and frequency resources associated with resource pool 315 during a portion 330 (also referred to as "$T_{P2V}$ duration 330") of the ON duration 305 to broadcast information to V-UEs 115. For example, P-UEs 115 may broadcast an identifier (ID) (e.g., a pseudo ID), location information (e.g., geographical positioning information (GPS)), a cause indication (e.g., an intent, trajectory data, etc.), and the like, on configured time and frequency resources of resource pool 315 (e.g., configured PRBs). The pseudo identifier may be an identifier generated by a P-UE 115, rather than an identifier assigned to the P-UE 115 by a base station 105, wireless communications system 100, manufacturer, or the like. In some examples, P-UEs 115 may contend to use the $T_{P2V}$ duration 330. For example, the P-UEs 115 may perform a clear channel assessment procedure (e.g., a listen before talk (LBT) procedure) to determine a resource block for transmission within the $T_{P2V}$ duration 330 prior to transmitting the message within the resource block of the $T_{P2V}$ duration 330.

Additionally, resource pool 320 may include time and frequency resources for V-UEs 115 to transmit information to P-UEs 115 during a portion 335 (also referred to as "$T_{V2P}$ duration 335") of the ON duration 305. In some examples, resource pools 315, 320 may be referred to as one or more of transmit pools and receive pools. The transmission and reception by P-UEs 115 and V-UE 115 may be interchangeable (e.g., the order of resource pools 315, 320 in time may be flipped). That is, the transmission and reception may occur in any order.

The P-UE common wake up cycle 300 may additionally or alternatively include a paging occasion, where V-UEs 115 transmit paging indication messages to P-UEs 115 on one or more paging resources 325. In some examples, a paging occasion may correspond to a particular subframe number (SFN) across multiple V-UEs 115, such that multiple V-UEs 115 may broadcast paging indication messages simultaneously over a same radio frequency spectrum band (or frequency channel) in a same one or more subframes. In some examples, the one or more paging resources 325 may include time and frequency resources adjacent to and between resource pools 315, 320. V-UEs 115 may transmit one or more paging indication signals during one or more paging occasions to notify P-UEs 115 of an impending collision indication, if such a collision is predicted. For example, a V-UE 115 may transmit a paging indication signal during a paging occasion to a P-UE 115, which may be a warning message to inform the P-UE 115 that the P-UE 115 is on a collision course with the V-UE 115. In some examples, the paging indication signals may be transmitted by one or more V-UEs 115 using paging resources 325, and the paging indication signals may indicate that at least one or more P-UEs 115 are in a collision course with one or more V-UEs 115, but may not provide detailed information about which P-UEs 115 are in the collision course.

P-UEs 115 may monitor for a paging message from V-UEs 115, and determine to active or deactivate their corresponding PC5 interface based on whether a paging indication message is received in paging resource 325. For example, if P-UEs 115 receive a paging indication message from V-UEs 115 in paging resource 325, P-UEs 115 may monitor (listen) for V2P messages from one or more V-UEs 115 on time and frequency resources associated with resource pool 320 during $T_{V2P}$ duration 330 of the ON duration 305. After the $T_{V2P}$ duration 330 of the ON duration 305 lapses, P-UEs 115 may deactivate their corresponding PC5 interface and switch to a reduced power mode (e.g., a sleep mode) for the OFF duration 310. In the absence receiving of a paging indication message from V-UEs (i.e., P-UEs 115 do not receive a paging message from V-UEs 115) in paging resource 325, P-UEs 115 may deactivate their corresponding PC5 interface and switch to a reduced power mode, following (e.g., immediately after) the paging occasion until a next ON duration 305. Thus, P-UEs 115 may experience added power savings because the period that the P-UEs 115 are in the reduced power mode is extended (e.g., $T_{V2P}$ duration 330 plus $T_{PC5OFF}$ duration 310). The P-UE common wake up cycle 300 may therefore include features for improved UE 115 operations, and in some examples, may promote improved energy efficiencies, among other benefits by allowing configuring a common PC5 wake up cycle for P-UEs 115. Alternative wake up cycles are further described in more detail herein with reference to FIGS. 4A through 4D.

Figure 4A:
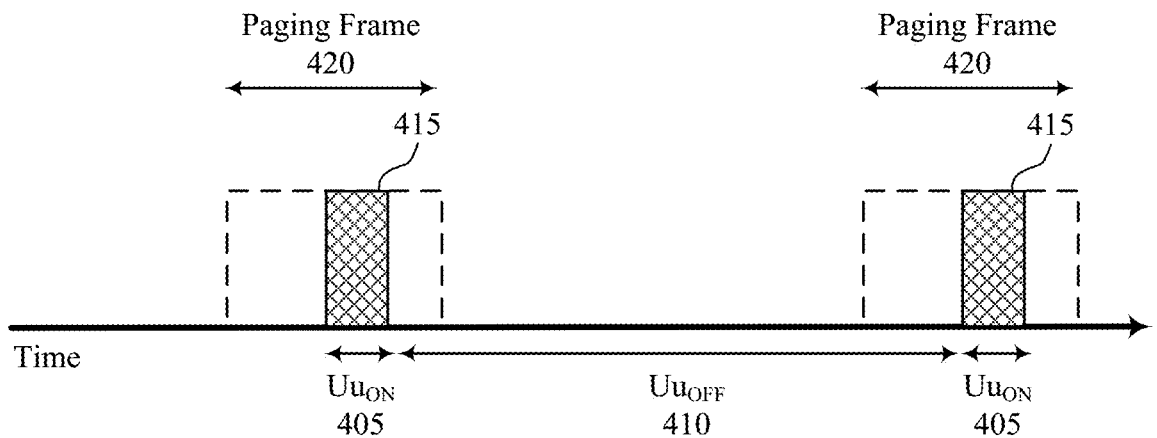
FIGS. 4A through 4D illustrate examples of a P-UE specific wake up cycle in accordance with aspects of the present disclosure.

FIG. 4A illustrates an example of a P-UE specific wake up cycle 400-a in accordance with aspects of the present disclosure. The P-UE specific wake up cycle 400-a may implement aspects of wireless communications system 100 and V2P wireless communications system 200, as described with reference to FIGS. 1 and 2. For example, the P-UE specific wake up cycle 400-a may be based on a configuration by a base station 105, and implemented by a UE 115 for activating and deactivating certain RF components of the UE 115 for providing improvements to power management, among other advantages.

The P-UE specific wake up cycle 400-a may correspond to an LTE Uu P-UE 115 wake up cycle, and may include an ON duration 405 (also referred to as "$Uu_{ON}$ duration 405") and an OFF duration 410 (also referred to as "$Uu_{OFF}$ duration 410"), in which the LTE P-UE 115 may switch in and out of a reduced power mode (e.g., a deep sleep mode). In some examples, P-UE specific wake up cycle 400-a may correspond to a certain radio access technology including 4G systems such as LTE systems, 5G systems which may be referred to as NR systems, and Wi-Fi systems (e.g., wireless local area network (WLAN) systems). An LTE Uu P-UE 115 may transmit or receive one or more paging messages during a paging occasion 415 associated with a paging frame 420. For example, the LTE P-UE 115 may provide an indication of one or more PC5 wake up occasions in a pedestrian to vehicle (P2V) message to a V-UE 115. As such, the LTE P-UE 115 may activate and deactivate one or more radio frequency (RF) components. For example, the LTE P-UE 115 may, prior to deactivating (e.g., powering down) one or more of LTE and NR radio RF components (e.g., antennas, RF circuitry), activate a PC5 interface for receiving V2P messages from one or more V-UEs 115, or transmit P2V messages from one or more P-UEs 115. An example wake up cycle relating to PC5 interface operation is further described in more detail herein with reference to FIG. 4B.

Figure 4B:
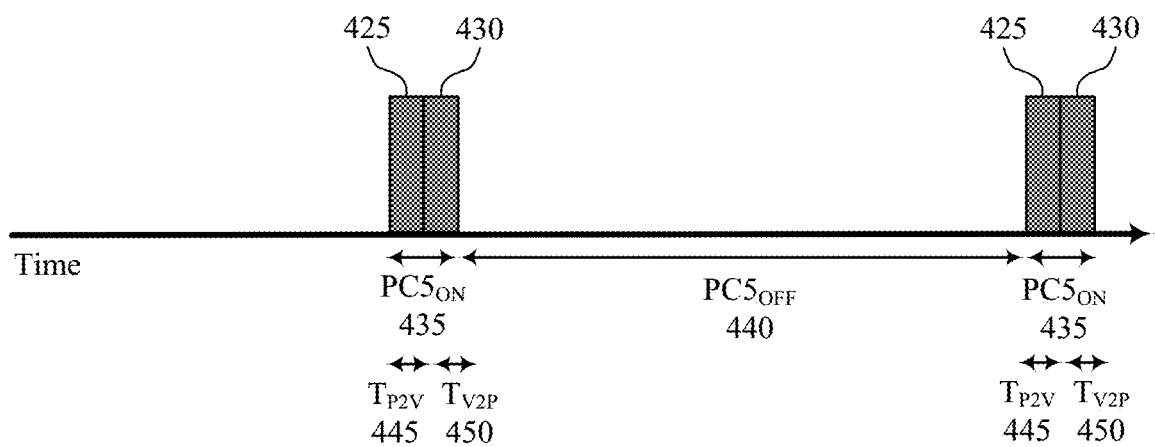

FIG. 4B illustrates an example of a P-UE specific wake up cycle 400-b in accordance with aspects of the present disclosure. The P-UE specific wake up cycle 400-b may implement aspects of wireless communications system 100 and V2P wireless communications system 200, as described with reference to FIGS. 1 and 2. For example, the P-UE specific wake up cycle 400-b may be based on a configuration by a base station 105, and implemented by a UE 115 for activating and deactivating a PC5 interface to support robustness for PC5 interface operation and improvement in power management relating to PC5 interface operation, among other advantages.

The P-UE specific wake up cycle 400-b may correspond to a PC5 P-UE 115 wake up cycle, and may include an ON duration 435 (also referred to as "$PC5_{ON}$ duration 435" or wake up time period) and an OFF duration 440 (also referred to as "$PC5_{OFF}$ duration 440"), in which the PC5 P-UE 115 may switch in and out of a reduced power mode (e.g., a deep sleep mode). The $PC5_{ON}$ duration 435 may be associated with time and frequency resources of a resource pool 425 relating to P2V communications and a resource pool 430 relating to V2P communications. In some examples, there may not be any ordering in the resource pools (e.g., the resource pool 425 or 430 could be flipped). The time and frequency resources associated with the resource pools 425 and 430 may be contiguous or noncontiguous in one or more of a time domain and a frequency domain. In some examples, the time and frequency resources associated with the resource pools 425 and 430 may be preconfigured. For example, the time and frequency resources associated with the resource pools 425 and 430 may be a set of one or more PRBs configured by a base station 105 or configured by a P-UE or V-UE.

In some examples, the P-UE specific wake up cycle 400-b may follow the P-UE specific wake up cycle 400-a described in FIG. 4A. For example, the P-UE specific wake up cycle 400-a, 400-b may be contiguous in a time domain (e.g., occur back-to-back in a time domain to avoid powering ON and OFF RF circuitry (e.g., modems)). For example, a last symbol period of paging occasion 415 may be adjacent in time to a beginning symbol period of resource pool 425. In some cases, there may be a gap period (delay) between the P-UE specific wake up cycle 400-a, 400-b. For example, the gap period may be a number of symbols in a time domain (e.g., between Uu power down and PC5 power up). In some examples, the gap period may correspond to the P-UE 115 deactivating certain RF components (e.g., powering down LTE, NR RF components) corresponding to a radio access technology (e.g., LTE, NR) and activating a PC5 interface (e.g., powering up the PC5 interface). In some examples, the gap period may be a duration of time (e.g., one or more symbol periods) between a last symbol period of paging occasion 415 and a beginning symbol period of resource pool 425. The PC5 wake up cycle 400-b can be partially aligned with the Uu wake-up cycle 400-a. For example, RF cool down of Uu could align with RF warm up of PC5. The PC5 wake up cycle 400-b can be fully aligned with Uu wake up cycle 400-a, in that the RF warm up, cool down of both Uu and PC5 may coincide. In order to accommodate the resource pool 425 (e.g., P2V pool), and the resource pool 430 (e.g., V2P pool) of the PC5 to be aligned with the Uu wake up, there may be a delay for the RF cool down of Uu/PC5 interface.

The PC5 interface (e.g., RF components) may be powered ON for a total duration of $T_{P2V}$ 445 and $T_{V2P}$ 450 during which the P-UE 115 may transmit information to V-UEs 115 (e.g., pseudo ID, location, intent, trajectory), as well as PC5 paging cycle information (e.g., wake up SFN, slot cycle, wake up occasions, etc.) relating to next occasion of the resource pool 425. One or more V-UEs 115 may transmit information (e.g., via V2P communications) using time and frequency resources in resource pool 430 during one or more wake up occasions of P-UEs 115 (e.g., based on an indication of the PC5 wake-up occasions or PC5 wake-up schedule indicated in the P2V message by the P-UEs 115). The transmitted information may include a warning message including a pseudo ID of one or more P-UEs 115 with which the one or more V-UEs 115 may be on a collision course (e.g., predicted collision). P-UEs 115 may receive the information and determine if there is any warning messages addressed to the corresponding P-UE 115, and thereby perform one or more corrective actions (e.g., notify corresponding pedestrian of the forecasted collision course, for example, via a notification message or the like).

Thus, by correlating the P-UE specific wake up cycle 400-a, 400-b UEs 115 may experience the benefits described herein. Additionally, by linking P-UE specific wake up cycles 400-a, 400-b, PC5 wake up cycles may be different among different P-UEs 115. That is, by associating P-UE 115 PC5 wake up cycle with LTE, NR wake up cycles, P-UEs 115 may benefit from avoiding possible interference from other UEs 115 relating to P2V, V2P communications.

Figure 4C:
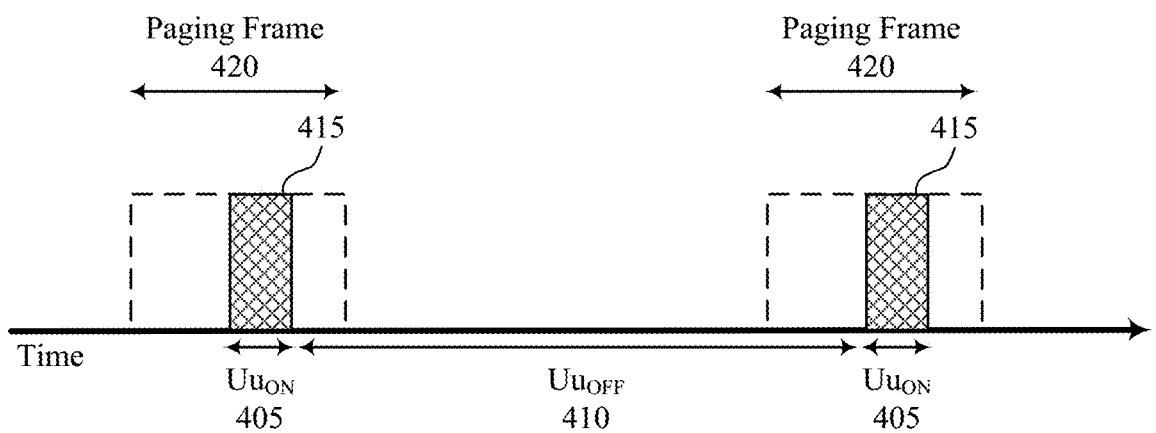

FIG. 4C illustrates an example of a P-UE specific wake up cycle 400-c in accordance with aspects of the present disclosure. The P-UE specific wake up cycle 400-c may implement aspects of wireless communications system 100 and V2P wireless communications system 200, as described with reference to FIGS. 1 and 2. For example, the P-UE specific wake up cycle 400-c may be based on a configuration by a base station 105, and implemented by a UE 115 for activating and deactivating a PC5 interface to support robustness for PC5 interface operation and improvement in power management relating to PC5 interface operation, among other advantages.

The P-UE specific wake up cycle 400-c may correspond to a different LTE P-UE 115 wake up cycle and a different P-UE 115 compared to the P-UE specific wake up cycle 400-a and P-UE 115 described in FIG. 4A. As illustrated in FIG. 4C, ON duration 405 and OFF duration 410 are different from ON duration 405 and an OFF duration 410 of the P-UE specific wake up cycle 400-a and P-UE 115 described in FIG. 4A. Therefore, a PC5 wake up cycle associated with the P-UE specific wake up cycle 400-c may be different.

Figure 4D:
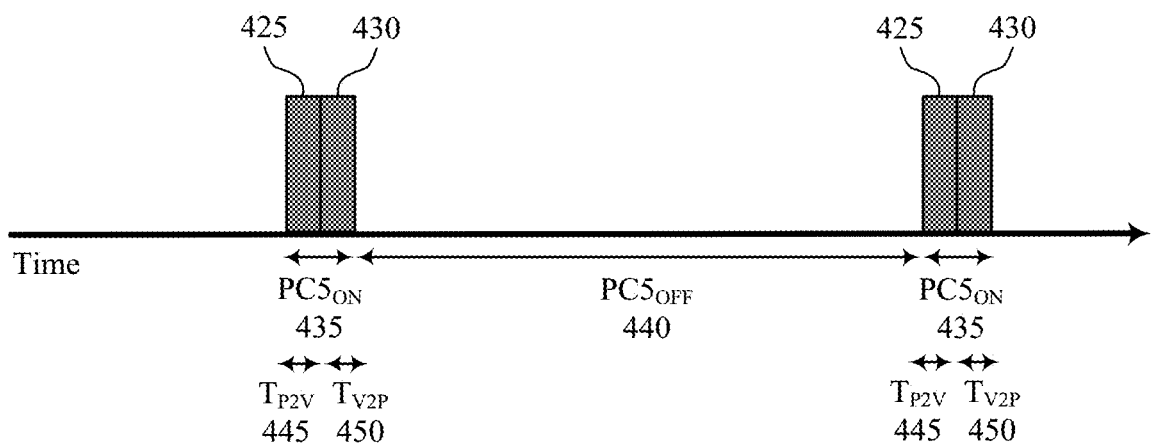

FIG. 4D illustrates an example of a P-UE specific wake up cycle 400-d in accordance with aspects of the present disclosure. The P-UE specific wake up cycle 400-d may implement aspects of wireless communications system 100 and V2P wireless communications system 200, as described with reference to FIGS. 1 and 2. For example, the P-UE specific wake up cycle 400-d may be based on a configuration by a base station 105, and implemented by a UE 115 for activating and deactivating a PC5 interface to support robustness for PC5 interface operation and improvement in power management relating to PC5 interface operation, among other advantages. The P-UE specific wake up cycle 400-d may correspond to a different PC5 P-UE 115 wake up cycle and a different P-UE 115 compared to the P-UE specific wake up cycle 400-b and P-UE 115 described in FIG. 4B.

Figure 5:
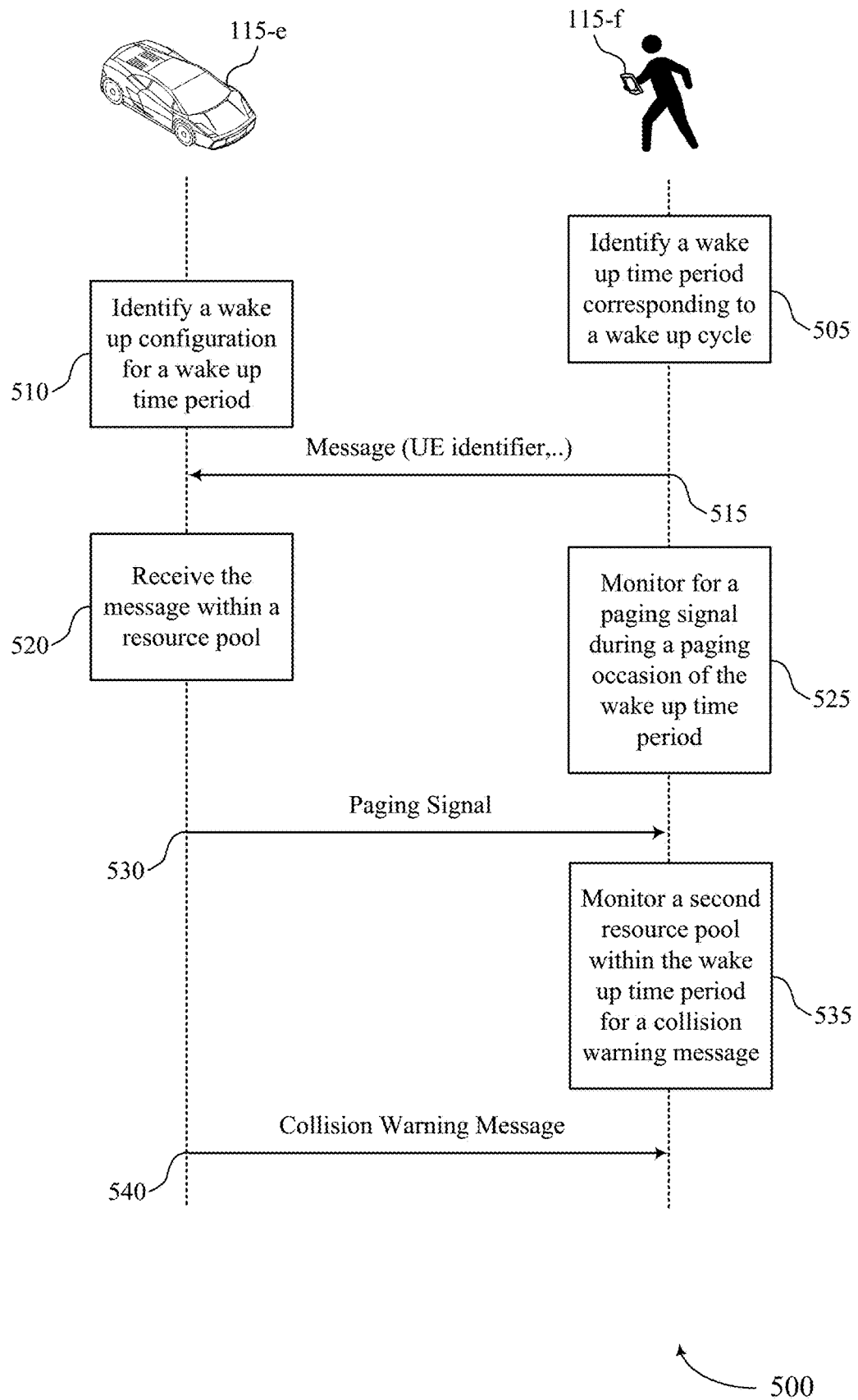
FIGS. 5 and 6 illustrate examples of a process flow in accordance with aspects of the present disclosure.

FIG. 5 illustrates an example of a process flow 500 in accordance with aspects of the present disclosure. The process flow 500 may implement aspects of the wireless communications system 100 and the V2P wireless communications system 200, as described with reference to FIGS. 1 and 2. For example, the process flow 500 may be based on a configuration by a base station 105 or a UE 115, and implemented by the UE 115 for reduced power consumption, improved reliability for D2D communications, such as V2P communications and, in some examples, may improve low latency D2D communications, among other benefits.

The process flow 500 may include UEs 115-e, 115-f, which may be examples of UEs 115 as described with reference to FIGS. 1 and 2. For example, UE 115-e may be a V-UE (hereby referred to as V-UE 115-e) while UE 115-f may be a P-UE (hereby referred to as P-UE 115-f). In the following description of the process flow 500, the operations between the V-UE 115-e and the P-UE 115-f may be transmitted in a different order than the example order shown, or the operations performed by the V-UE 115-e and the P-UE 115-f may be performed in different orders or at different times, or both. Some operations may also be omitted from the process flow 500, and other operations may be added to the process flow 500.

At 505, the P-UE 115-f may identify a wake up time period corresponding to a wake up cycle. In some examples, the P-UE 115-f may identify the wake up time period corresponding to the wake up cycle based on receiving a wake up configuration, for example, from a base station 105 or the V-UE 115-e. Alternately, the P-UE 115 can autonomously decide on the next wake-up cycle. The wake up configuration may indicate the wake up time period and the wake up cycle, an example of which is discussed in FIG. 3.

At 510, the V-UE 115-e may identify a wake up configuration for a wake up time period. For example, the V-UE 115-e may identify the wake up configuration based on receiving the configuration from a base station 105.

At 515, the P-UE 115-f may transmit a message to the V-UE 115-e. In some examples, the message may include an identifier of the P-UE 115-f. In some examples, the identifier may be a pseudo identifier of the P-UE 115-f Additionally or alternatively, the message may include location data of the P-UE 115-f, sensor data of the P-UE 115-f, trajectory data of the P-UE 115-f, or any combination thereof. The trajectory data may indicate a predicted geolocation of the P-UE 115-f over time based on a current speed and direction measured by P-UE 115-f. The transmission of the message from the P-UE 115-f to the V-UE 115-e may be via a sidelink channel using a sidelink interface of the P-UE 115-f. In some examples, the P-UE 115-f may transmit the message within a first resource pool during a first portion of the wake up time period based on the wake up cycle. The P-UE 115-f may, in some examples, perform a clear channel assessment procedure to determine a resource block for transmission within the first resource pool prior to transmitting the message within the resource block.

At 520, the V-UE 115-e may receive the message within a resource pool. For example, the V-UE 115-e may receive the message within a first portion of the wake up time period and within a first resource pool. At 525, the P-UE 115-f may monitor for a paging signal during a paging occasion of the wake up time period.

At 530, the V-UE 115-e may transmit a paging signal to the P-UE 115-f. The V-UE 115-e may generate a prediction that the V-UE 115-e is on a collision course with the P-UE 115-f based on the message, and transmit the paging signal based on predicted that a collision may occur. For example, the V-UE 115-e may predict a collision with the P-UE 115-f based on the received location data of the P-UE 115-f, sensor data of the P-UE 115-f, trajectory data of the P-UE 115-f, or any combination thereof. The prediction may also be based on the location data of the V-UE 115-e, sensor data of the V-UE 115-e, trajectory data of the V-UE 115-e, or any combination thereof. The V-UE 115-e may use its data and data received by P-UE 115-f to predict whether a collision is possible, likely, or imminent with the P-UE 115-f. If a collision is predicted, the V-UE 115-e may transmit a paging signal during the paging occasion. The V-UE 115-e may alter a speed of the V-UE 115-e, a trajectory of the V-UE 115-e, or both, based on the prediction.

At 535, the P-UE 115-f may monitor a second resource pool within the wake up time period for a collision warning message. At 540, the V-UE 115-e may transmit a collision warning message to the P-UE 115-f. The collision warning message may include the identifier of the P-UE 115-f communicated at 515, and be transmitted based on the V-UE 115-e predicting a collision with P-UE 115-f. In some examples, the V-UE 115-e may be communicating with a set of P-UEs 115, and may transmit a set of collision warning messages. Each of the collision warning messages may include an identifier of a respective P-UE 115 with which the V-UE 115-e predicts a collision to occur. In some cases, a single collision warning message may be transmitted that includes an each P-UE 115 with which the V-UE 115-e predicts a collision to occur. The P-UE 115-f may receive the collision warning message, determine that the message includes the identifier of the P-UE 115-f, and present an alert based on the collision warning message.

Figure 6:
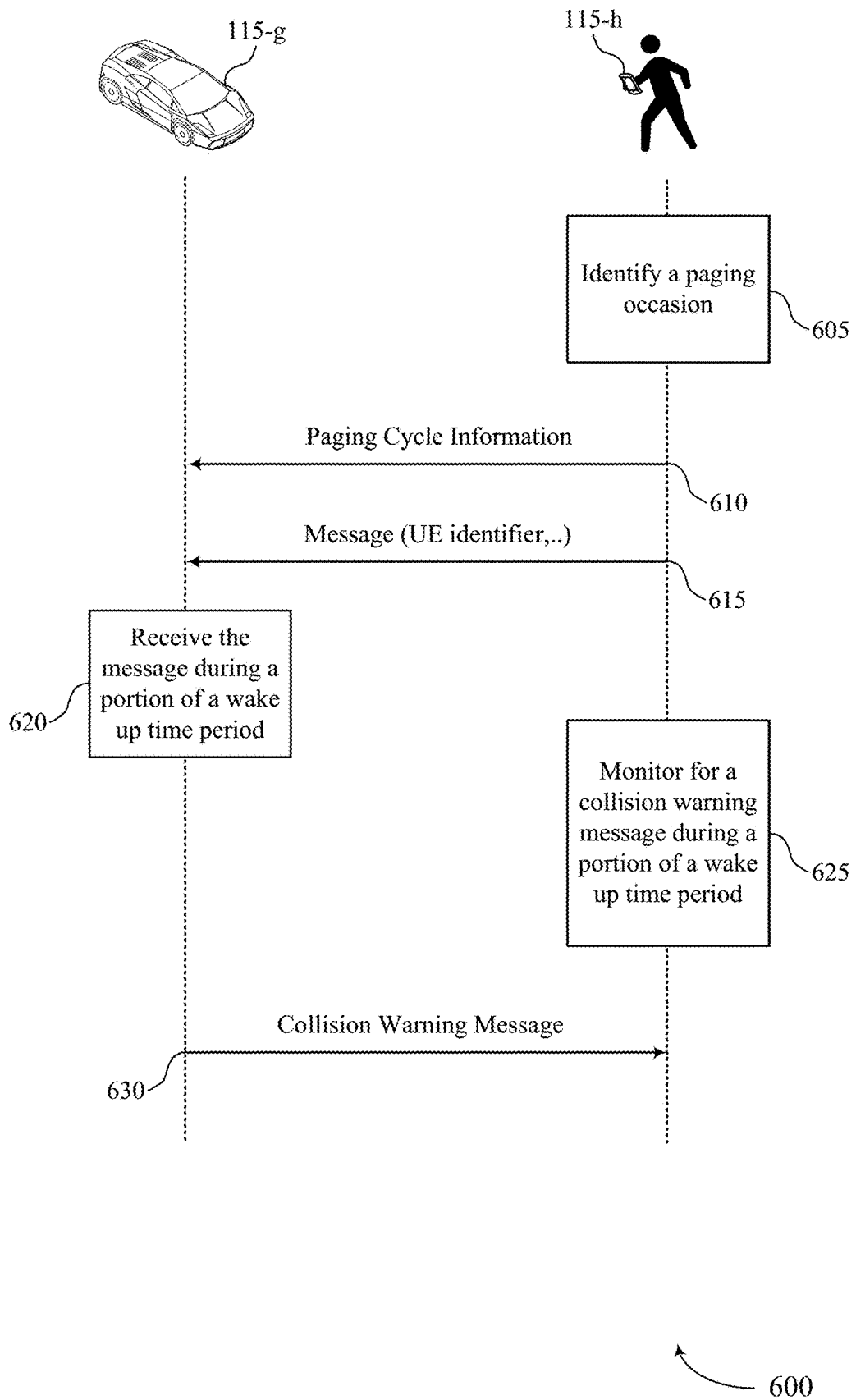

FIG. 6 illustrates an example of a process flow 600 in accordance with aspects of the present disclosure. The process flow 600 may implement aspects of the wireless communications system 100 and the V2P wireless communications system 200, as described with reference to FIGS. 1 and 2. For example, the process flow 600 may be based on a configuration by a base station 105 or a UE 115, and implemented by the UE 115 for reduced power consumption, improved reliability for D2D communications, such as V2P communications and, in some examples, may improve low latency D2D communications, among other benefits.

The process flow 600 may include UEs 115-g, 115-h, which may be examples of UEs 115 as described with reference to FIGS. 1 and 2. For example, UE 115-g may be a V-UE (hereby referred to as V-UE 115-g) while UE 115-h may be a P-UE (hereby referred to as P-UE 115-h). In the following description of the process flow 600, the operations between the V-UE 115-g and the P-UE 115-h may be transmitted in a different order than the example order shown, or the operations performed by the V-UE 115-g and the P-UE 115-h may be performed in different orders or at different times. Some operations may also be omitted from the process flow 600, and other operations may be added to the process flow 600.

At 605, the P-UE 115-h may identify a paging occasion, as discussed in FIGS. 4A-4D. For example, the P-UE 115-h may identify a paging occasion for a first RAT that may be different than a paging occasion of a sidelink RAT. In some examples, the first RAT may be an LTE RAT or an NR RAT. The paging occasion of the first RAT may be used for determining the location of a P-UE specific wake up cycle and a wake up time period relative thereto. In some cases, the wake up time period may be adjacent to the paging occasion, may partially overlap the paging occasion, or may be offset from the paging occasion in time.

At 610, the P-UE 115-*h* may transmit paging cycle information that indicates a paging cycle of a wake up time period. For example, the paging cycle information may indicate when the paging occasion 415 occurs, when the ON duration 435 occurs relative to paging occasion 415, a duration of the paging occasion 415, a periodicity of the paging occasion 415, or any combination thereof. In some cases, the wake up time period (e.g., ON duration 435) may be adjacent to the paging occasion (e.g., paging occasion 415), may partially overlap the paging occasion, or may be offset from the paging occasion in time.

At 615, the P-UE 115-*h* may transmit a message via the sidelink RAT, which may include an identifier of the P-UE 115-*h* during a first portion of a wake up time period (e.g., $T_{P2V}$ 445) positioned relative to the paging occasion of the first RAT (e.g., paging occasion 415). In some examples, the message may include a location data of the P-UE 115-*h*, trajectory data of the P-UE 115-*h*, sensor data of the P-UE 115-*h*, or any combination thereof.

At 620, the V-UE 115-*g* may receive the message during a portion of a wake up time period. For example, the V-UE 115*g* may receive the message during a first portion (e.g., $T_{P2V}$ 445) of the wake up time period that occurs relative to the paging occasion of the first RAT. In some cases, the V-UE 115*g* may be communicating with a set of P-UEs and may receive paging cycle information from each of the P-UEs 115, similar to the message communicated at 610, and a message from each of the P-UEs 115, similar to the message communicated at 615.

At 625, the P-UE 115*h* may monitor for a collision warning message during a second portion (e.g., $T_{V2P}$ 450) of a wake up time period. For example, the P-UE 115*h* may monitor for a collision warning message during a second portion of the wake up time period that occurs relative to the first portion.

At 630, the V-UE 115*g* may transmit a collision warning message to the P-UE 115*h*, if V-UE 115*g* predicts a collision with P-UE 115*h* as described herein. In some examples, the V-UE 115*g* may be communicating with a set of P-UEs 115, and may transmit a set of one or more collision warning messages, as described herein. The V-UE 115*g* may also attempt to prevent the collision, as described herein. The collision warning message may include the identifier of the P-UE 115*h* communicated at 615, and may be transmitted based on the V-UE 115*g* predicting a collision with P-UE 115*h*. The P-UE 115*h* may receive the collision warning message, determine that the message includes the identifier of the P-UE 115*h*, and present an alert based on the collision warning message.

Figure 7:
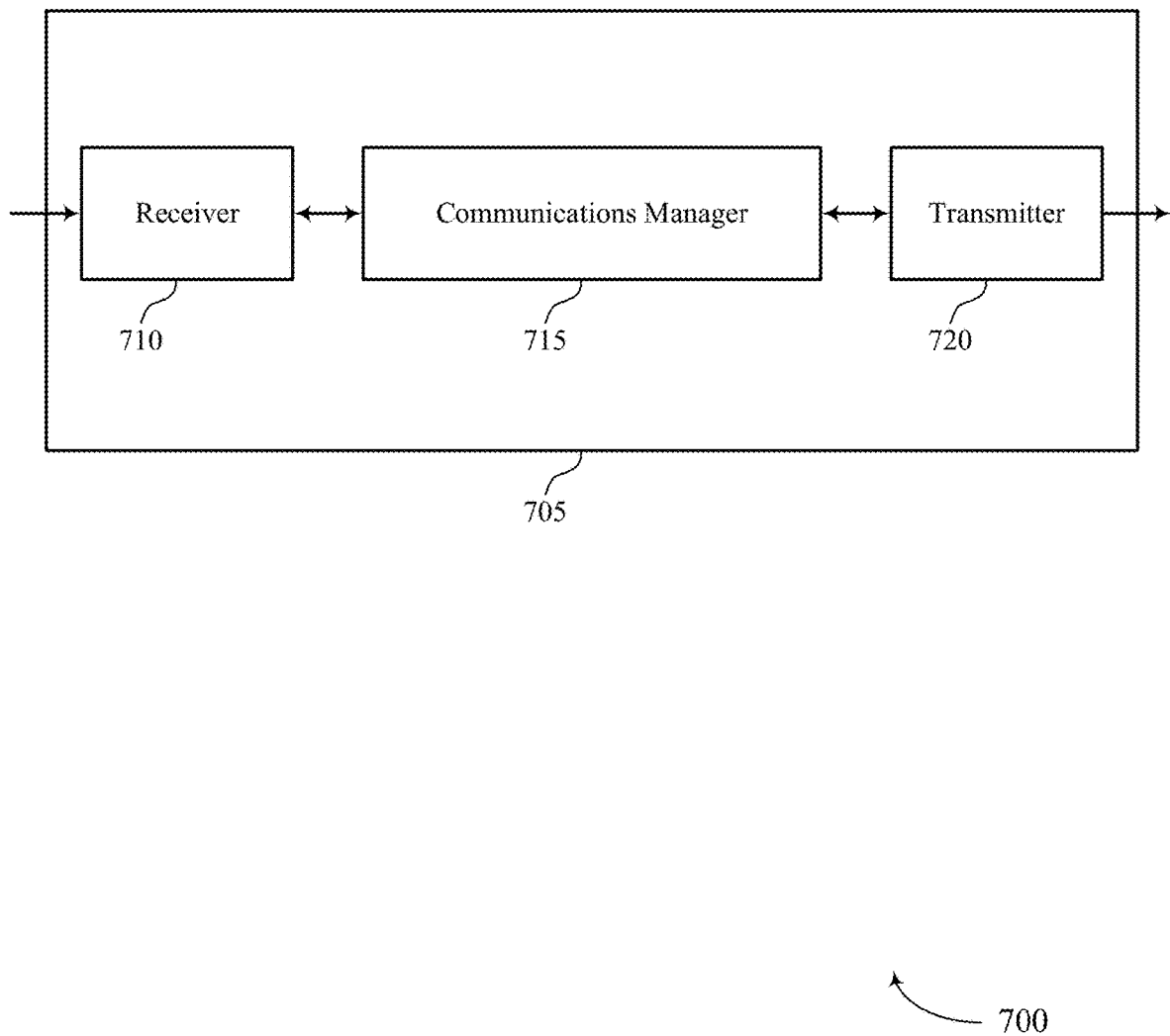
FIGS. 7 and 8 show block diagrams of devices in accordance with aspects of the present disclosure.

FIG. 7 shows a block diagram 700 of a device 705 in accordance with aspects of the present disclosure. The device 705 may be an example of aspects of a UE 115 as described herein. For example, the device 705 may be a P-UE 115 or a V-UE 115. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to power enhancement techniques for V2P wireless communication systems, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a wake up time period corresponding to a wake up cycle, transmit a message that includes an identifier of the UE within a first resource pool during a first portion of the wake up time period based on the wake up cycle, and monitor for a paging signal from a vehicle UE during a paging occasion of the wake up time period based on transmitting the message. The communications manager 715 may also identify a wake up configuration for a wake up time period, receive, within a first portion of the wake up time period, a message within a first resource pool that includes an identifier of a first UE and at least one of location data of the first UE, sensor data of the first UE, or trajectory data of the first UE based on the wake up configuration, and transmit a paging signal within a paging occasion of the wake up time period based on at least one of the location data, the sensor data, or the trajectory data.

The communications manager 715 may also identify a paging occasion for a first RAT that is different than a paging occasion of a sidelink RAT, transmit, via the sidelink RAT, a message that includes an identifier of the UE during a first portion of a wake up time period positioned relative to the paging occasion of the first RAT, and monitor, during a second portion of the wake up time period that occurs relative to the first portion, for a collision warning message from a vehicle UE that includes the identifier of the UE. The communications manager 715 may also receive, from a first UE, paging cycle information that indicates a paging cycle of a wake up time period for a sidelink RAT relative to a paging occasion configured for the first UE by a first RAT, receive a message that includes an identifier of the first UE during a first portion of the wake up time period that occurs relative to the paging occasion of the first RAT, and transmit a collision warning message during a second portion of the wake up time period that occurs relative to the first portion based on the message. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
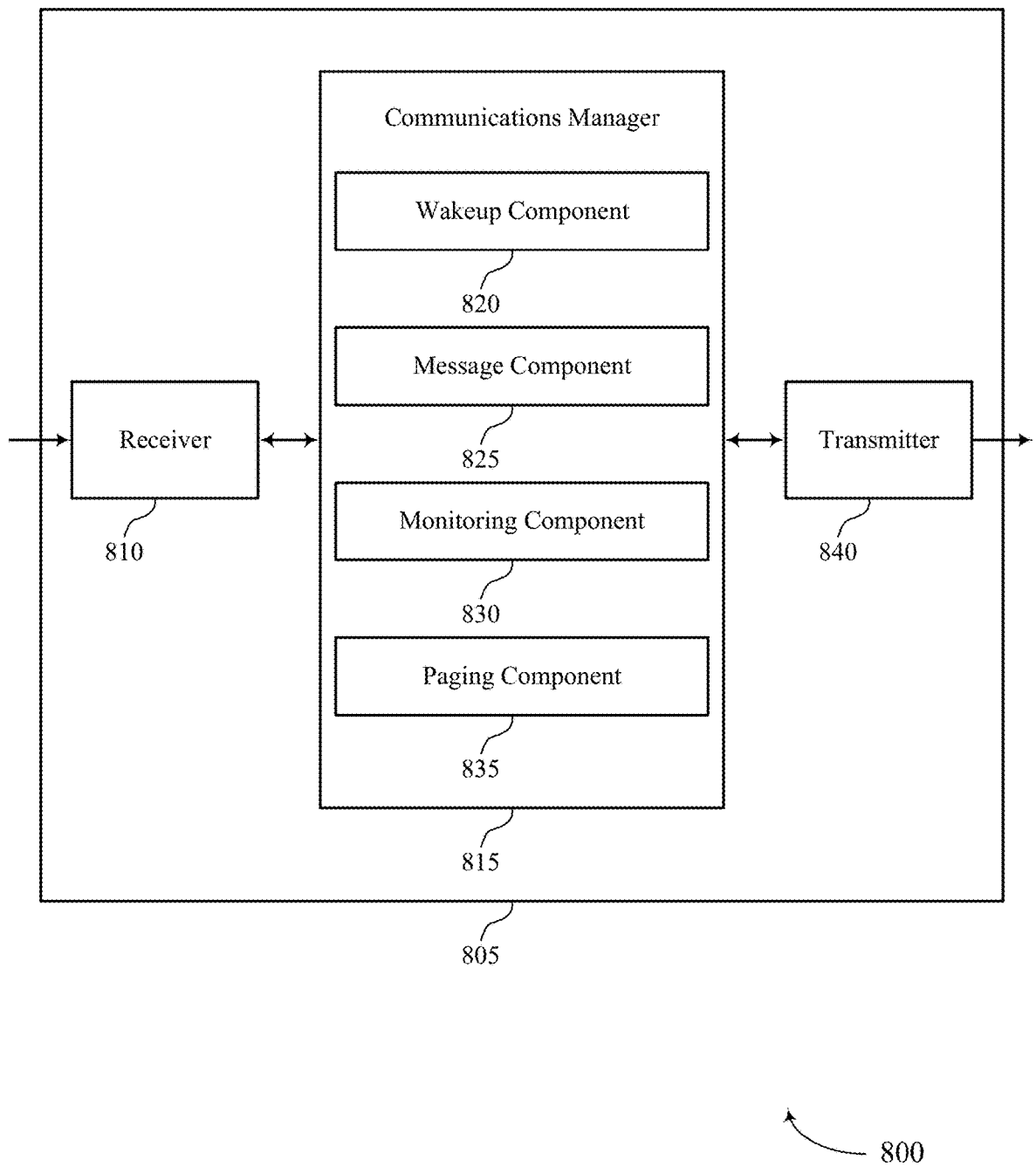

FIG. 8 shows a block diagram 800 of a device 805 in accordance with aspects of the present disclosure. The device 805 may be an example of aspects of a device 705, or a UE 115 as described herein. For example, the device 805 may be a P-UE 115 or a V-UE 115. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to power enhancement techniques for V2P wireless communication systems, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a wake up component 820, a message component 825, a monitoring component 830, and a paging component 835. The communications manager 815 may be an example of aspects of the communications manager 1010 described herein.

The wake up component 820 may identify a wake up time period corresponding to a wake up cycle. The message component 825 may transmit a message that includes an identifier of the device 805 within a first resource pool during a first portion of the wake up time period based on the wake up cycle. The monitoring component 830 may monitor for a paging signal from a vehicle UE during a paging occasion of the wake up time period based on transmitting the message.

The wake up component 820 may identify a wake up configuration for a wake up time period. The message component 825 may receive, within a first portion of the wake up time period, a message within a first resource pool that includes an identifier of a first UE and at least one of location data of the first UE, sensor data of the first UE, or trajectory data of the first UE based on the wake up configuration. The paging component 835 may transmit a paging signal within a paging occasion of the wake up time period based on at least one of the location data, the sensor data, or the trajectory data.

The paging component 835 may identify a paging occasion for a first RAT that is different than a paging occasion of a sidelink RAT. The message component 825 may transmit, via the sidelink RAT, a message that includes an identifier of the UE during a first portion of a wake up time period positioned relative to the paging occasion of the first RAT. The monitoring component 830 may monitor, during a second portion of the wake up time period that occurs relative to the first portion, for a collision warning message from a vehicle UE that includes the identifier of the UE.

The paging component 835 may receive, from a first UE, paging cycle information that indicates a paging cycle of a wake up time period for a sidelink RAT relative to a paging occasion configured for the first UE by a first RAT. The message component 825 may receive a message that includes an identifier of the first UE during a first portion of the wake up time period that occurs relative to the paging occasion of the first RAT and transmit a collision warning message during a second portion of the wake up time period that occurs relative to the first portion based on the message.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
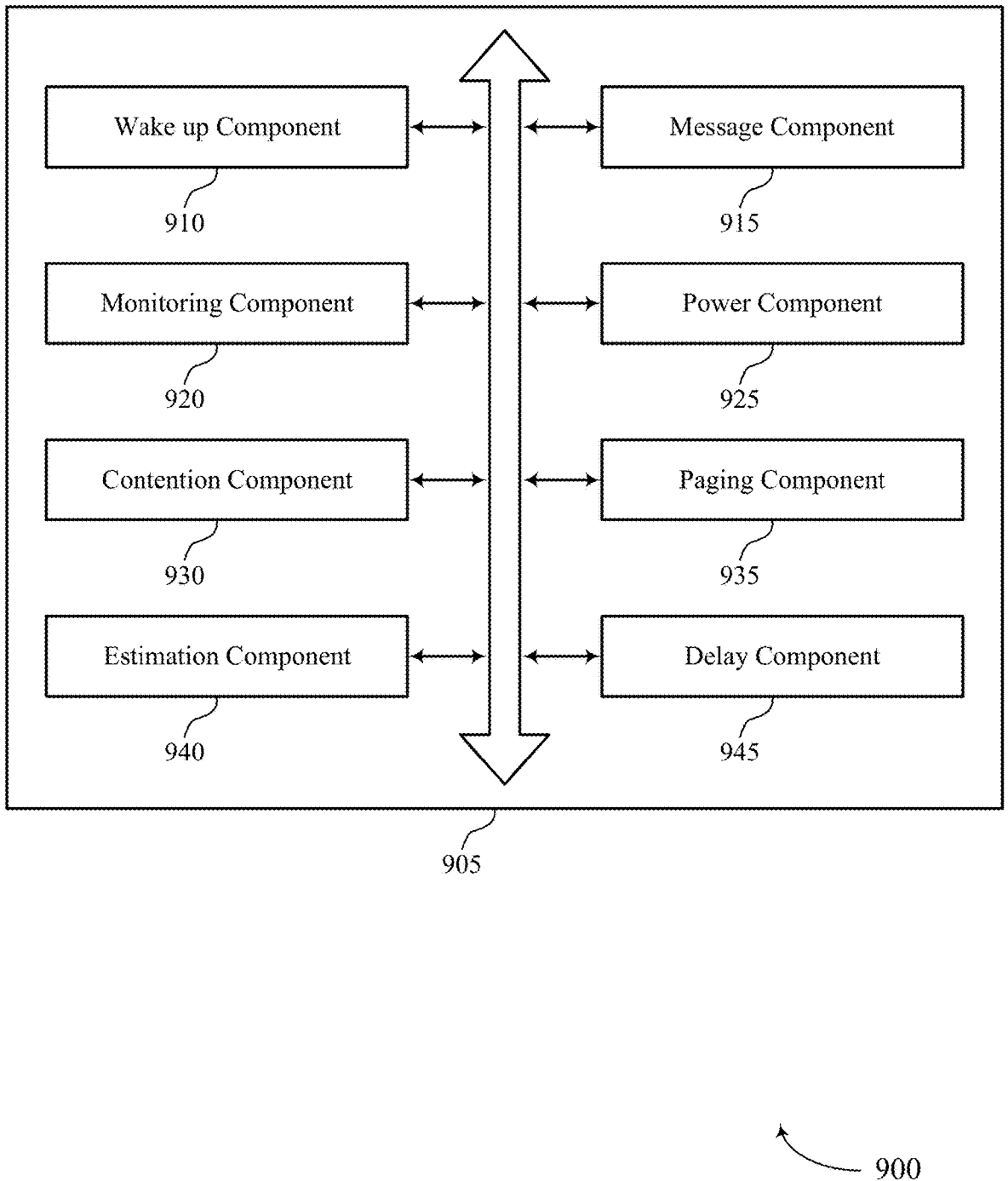
FIG. 9 shows a block diagram of a communications manager in accordance with aspects of the present disclosure.

FIG. 9 shows a block diagram 900 of a communications manager 905 in accordance with aspects of the present disclosure. The communications manager 905 may be an example of aspects of a communications manager 715, a communications manager 815, or a communications manager 1010 described herein. The communications manager 905 may include a wake up component 910, a message component 915, a monitoring component 920, a power component 925, a contention component 930, a paging component 935, an estimation component 940, and a delay component 945. Each of these modules may communicate, directly or indirectly, with one another (e.g., via one or more buses).

The wake up component 910 may identify a wake up time period corresponding to a wake up cycle. In some examples, the wake up component 910 may identify a wake up configuration for a wake up time period. In some examples, the wake up component 910 may receive a wake up configuration that indicates the wake up time period and the wake up cycle. In some examples, the wake up component 910 may transmit or receiving the wake up configuration that indicates a timing reference of the wake up time period, a periodicity of the wake up time period, or both. In some cases, the first portion of the wake up time period occurs before or after a second portion of the wake up time period.

The message component 915 may transmit a message that includes an identifier of the UE within a first resource pool during a first portion of the wake up time period based on the wake up cycle. In some examples, the message component 915 may receive, within a first portion of the wake up time period, a message within a first resource pool that includes an identifier of a first UE and at least one of location data of the first UE, sensor data of the first UE, or trajectory data of the first UE based on the wake up configuration. In some examples, message component 915 may transmit, via the sidelink RAT, a message that includes an identifier of the UE during a first portion of a wake up time period positioned relative to the paging occasion of the first RAT. In some examples, message component 915 may receive a message that includes an identifier of the first UE during a first portion of the wake up time period that occurs relative to the paging occasion of the first RAT.

In some examples, the message component 915 may transmit a collision warning message during a second portion of the wake up time period that occurs relative to the first portion based on the message. In some examples, the collision warning message includes the identifier of the UE and is transmitted based at least in part on the prediction. In some examples, the message component 915 may present an alert based on receiving the collision warning message. In some examples, the collision warning message includes an identifier of second UE that is different than the UE. In some examples, the message component 915 may discard the collision warning message.

In some examples, the message component 915 may transmit the message including the identifier that is a pseudo identifier of the UE. In some examples, the message component 915 may transmit the message including location data of the UE, sensor data of the UE, trajectory data of the UE, or any combination thereof. In some examples, the message component 915 may transmit the message via a sidelink channel using a sidelink interface of the UE.

In some examples, the message component 915 may receive, within a first portion of a second wake up time period, a second message within a first resource pool that includes an identifier of a second UE and location data of the second UE. In some examples, the message component 915 may receive a set of messages that includes a set of identifiers for a set of UEs. In some examples, the message component 915 may transmit, during a second portion of the wake up time period that occurs relative to the paging occasion, a collision warning message including an identifier of the at least one UE based on the prediction.

In some examples, the message component 915 may receive, within a first portion of a second wake up time period, a set of messages that includes a set of identifiers for a set of UEs. In some examples, the message component 915 may receive the message including the identifier that is a pseudo identifier of the first UE. In some examples, the message component 915 may receive the message via a sidelink channel using a sidelink interface of the UE. In some examples, the message component 915 may transmit the message including a location data of the UE, trajectory data of the UE, sensor data of the UE, or any combination thereof. In some examples, the collision warning message includes the identifier of the UE. In some examples, the message component 915 may present an alert based on the collision warning message. In some examples, the collision warning message includes an identifier of second UE that is different from the UE. In some examples, the message component 915 may discard the collision warning message. In some examples, the message component 915 may transmit the message via a sidelink channel using the sidelink RAT of the UE.

In some examples, the message component 915 may transmit the message including the identifier that is a pseudo identifier of the UE. In some examples, the message component 915 may receive the message including a location data of the first UE, trajectory data of the first UE, sensor data of the first UE, or any combination. In some examples, the message component 915 may receive, during a first portion of the second wake up time period that occurs relative to the second paging occasion of the first RAT, a second message that includes an identifier of the second UE. In some examples, the message component 915 may transmit, during a second portion of the second wake up time period that occurs relative to the first portion, a second collision warning message based on the second message. In some examples, the message component 915 may receive the message via a sidelink channel using the sidelink RAT. In some examples, the message component 915 may receive the message including the identifier that is a pseudo identifier of the first UE.

In some cases, the first portion of the wake up time period occurs before or after a second portion of the wake up time period. In some cases, the first portion of the wake up time period is aligned with, partially aligned with, occurs before, or occurs after, the paging occasion of the first RAT. In some cases, the first portion of the wake up time period occurs before or after the second portion of the wake up time period. In some cases, the first RAT is a LTE RAT or a NR RAT. In some cases, the first portion of the wake up time period is aligned with, partially aligned with, occurs before, or occurs after, the paging occasion of the first RAT. In some cases, the first portion of the wake up time period occurs before or after the second portion of the wake up time period.

The monitoring component 920 may monitor for a paging signal from a vehicle UE during a paging occasion of the wake up time period based on transmitting the message. In some examples, monitoring, during a second portion of the wake up time period that occurs relative to the first portion, for a collision warning message from a vehicle UE that includes the identifier of the UE. In some examples, the monitoring component 920 may receive the paging signal during the paging occasion. In some examples, the monitoring component 920 may monitor, during a second portion of the wake up time period that occurs relative to the first portion, a second resource pool within the wake up time period for a collision warning message from the vehicle UE based on receiving the paging signal.

The paging component 935 may transmit a paging signal within a paging occasion of the wake up time period based on at least one of the location data, the sensor data, or the trajectory data. In some examples, the paging component 935 may identify a paging occasion for a first RAT that is different than a paging occasion of a sidelink RAT. In some examples, the paging component 935 may receive, from a first UE, paging cycle information that indicates a paging cycle of a wake up time period for a sidelink RAT relative to a paging occasion configured for the first UE by a first RAT. In some examples, the paging component 935 may determine not to transmit the paging signal within a second paging occasion of the second wake up time period based on the prediction. In some examples, the paging component 935 may transmit paging cycle information that indicates a paging cycle of the wake up time period. In some examples, the paging component 935 may receive second paging cycle information that indicates a second paging cycle of a second wake up time period relative to a second paging occasion of the first RAT configured for a second UE, the second wake up time period being offset in time relative to the wake up time period.

The power component 925 may enter a low power state beginning after an end of the wake up time period that extends until a subsequent wake up time period. In some examples, the power component 925 may enter a low power state beginning at a second portion of the wake up time period that extends until a subsequent wake up time period based on determining that the paging signal was not received during the paging occasion within the wake up time period. In some examples, the power component 925 may enter a low power state beginning after an end of the wake up time period that extends until a subsequent wake up time period.

The contention component 930 may perform a clear channel assessment procedure to determine a resource block for transmission within the first resource pool. In some examples, the contention component 930 may transmit the message within the resource block based on a result of the clear channel assessment procedure.

The estimation component 940 may generate a prediction that the vehicle UE is on a collision course with the first UE based on the message, where the paging signal is transmitted within the paging occasion of the wake up time period based on the prediction. In some examples, the estimation component 940 may transmit a collision warning message including the identifier of the first UE within a second resource pool during a second portion of the wake up time period that occurs relative to the paging occasion based on the prediction. In some examples, the estimation component 940 may alter a speed of a vehicle that includes the vehicle UE, a trajectory of the vehicle, or both, based on the prediction. In some examples, the estimation component 940 may generate an alert based on the prediction.

In some examples, the estimation component 940 may generate a prediction that the vehicle UE is not on a collision course with the second UE based on the second message. In some examples, the estimation component 940 may generate a prediction that the vehicle UE is on a collision course with at least one UE of the set of UEs based on the set of messages, where the paging signal is transmitted within the paging occasion of the wake up time period based on the prediction. In some examples, the estimation component 940 may generate a prediction that the vehicle UE is not on a collision course with any of the set of UEs based on the set of messages. In some examples, the estimation component 940 may generate a prediction that the vehicle UE is on a collision course with the first UE based on the message, where the collision warning message includes the identifier of the first UE and is transmitted based on the prediction. In some examples, the estimation component 940 may alter a speed of a vehicle that includes the vehicle UE, a trajectory of the vehicle, or both, based on the prediction.

The delay component 945 may identify a configured delay between an end of the paging occasion of the first RAT and a beginning of the wake up time period for the sidelink RAT. In some examples, the delay component 945 may identify a configured delay between an end of the paging occasion of the first RAT and a beginning of the wake up time period of the sidelink RAT. In some cases, the first RAT is a LTE RAT or a NR RAT.

Figure 10:
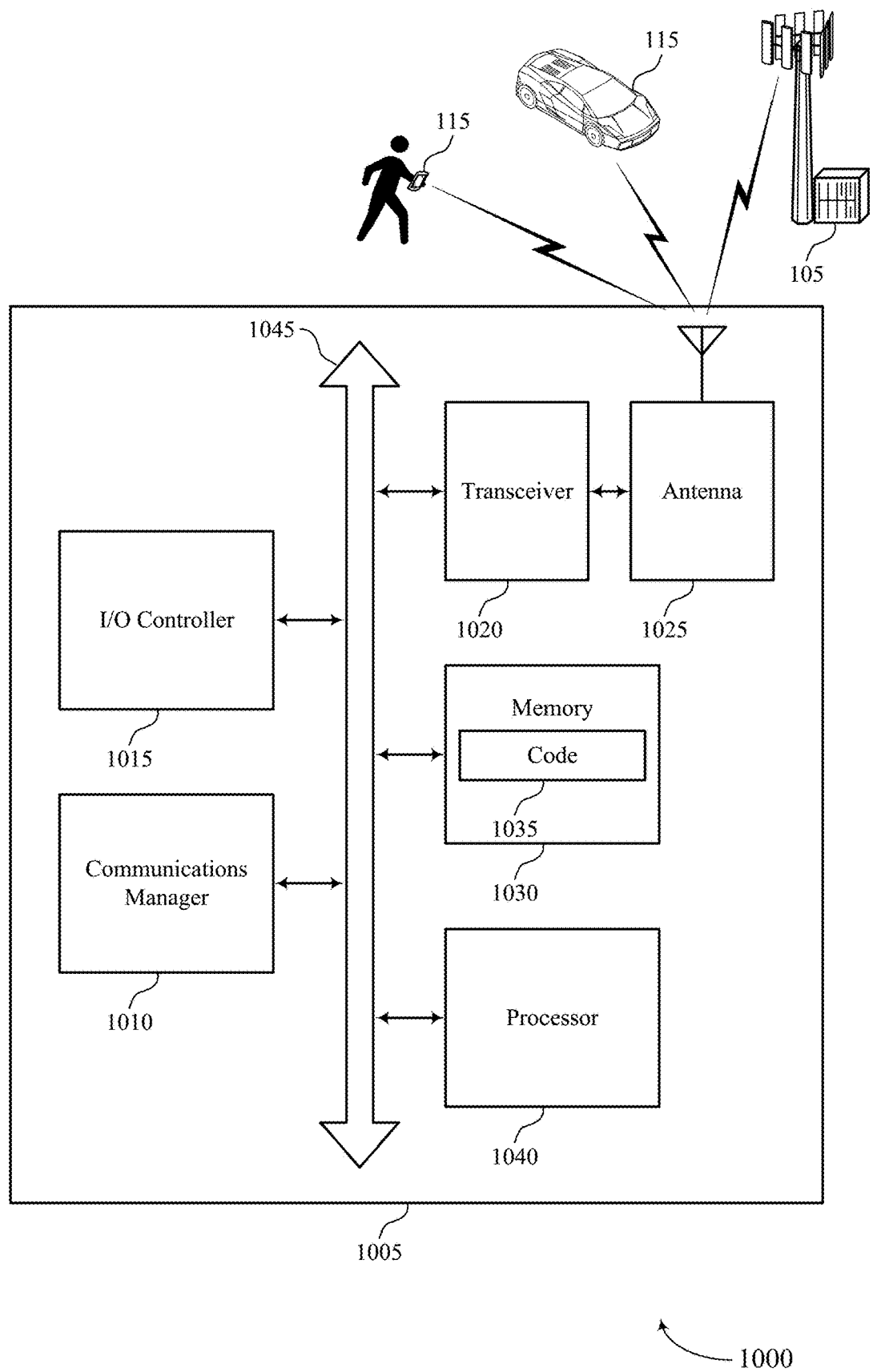
FIG. 10 shows a diagram of a system in accordance with aspects of the present disclosure.

FIG. 10 shows a diagram of a system 1000 including a device 1005 in accordance with aspects of the present disclosure. The device 1005 may be an example of or include the components of device 705, device 805, or a UE 115 as described herein. For example, the device 1005 may be a P-UE 115 or a V-UE 115. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a wake up time period corresponding to a wake up cycle, transmit a message that includes an identifier of the UE within a first resource pool during a first portion of the wake up time period based on the wake up cycle, and monitor for a paging signal from a vehicle UE during a paging occasion of the wake up time period based on transmitting the message. The communications manager 1010 may also identify a wake up configuration for a wake up time period, receive, within a first portion of the wake up time period, a message within a first resource pool that includes an identifier of a first UE and at least one of location data of the first UE, sensor data of the first UE, or trajectory data of the first UE based on the wake up configuration, and transmit a paging signal within a paging occasion of the wake up time period based on at least one of the location data, the sensor data, or the trajectory data.

The communications manager 1010 may also identify a paging occasion for a first RAT that is different than a paging occasion of a sidelink RAT, transmit, via the sidelink RAT, a message that includes an identifier of the UE during a first portion of a wake up time period positioned relative to the paging occasion of the first RAT, and monitor, during a second portion of the wake up time period that occurs relative to the first portion, for a collision warning message from a vehicle UE that includes the identifier of the UE. The communications manager 1010 may also receive, from a first UE, paging cycle information that indicates a paging cycle of a wake up time period for a sidelink RAT relative to a paging occasion configured for the first UE by a first RAT, receive a message that includes an identifier of the first UE during a first portion of the wake up time period that occurs relative to the paging occasion of the first RAT, and transmit a collision warning message during a second portion of the wake up time period that occurs relative to the first portion based on the message.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting power enhancement techniques for V2P wireless communication systems).

Figure 11:
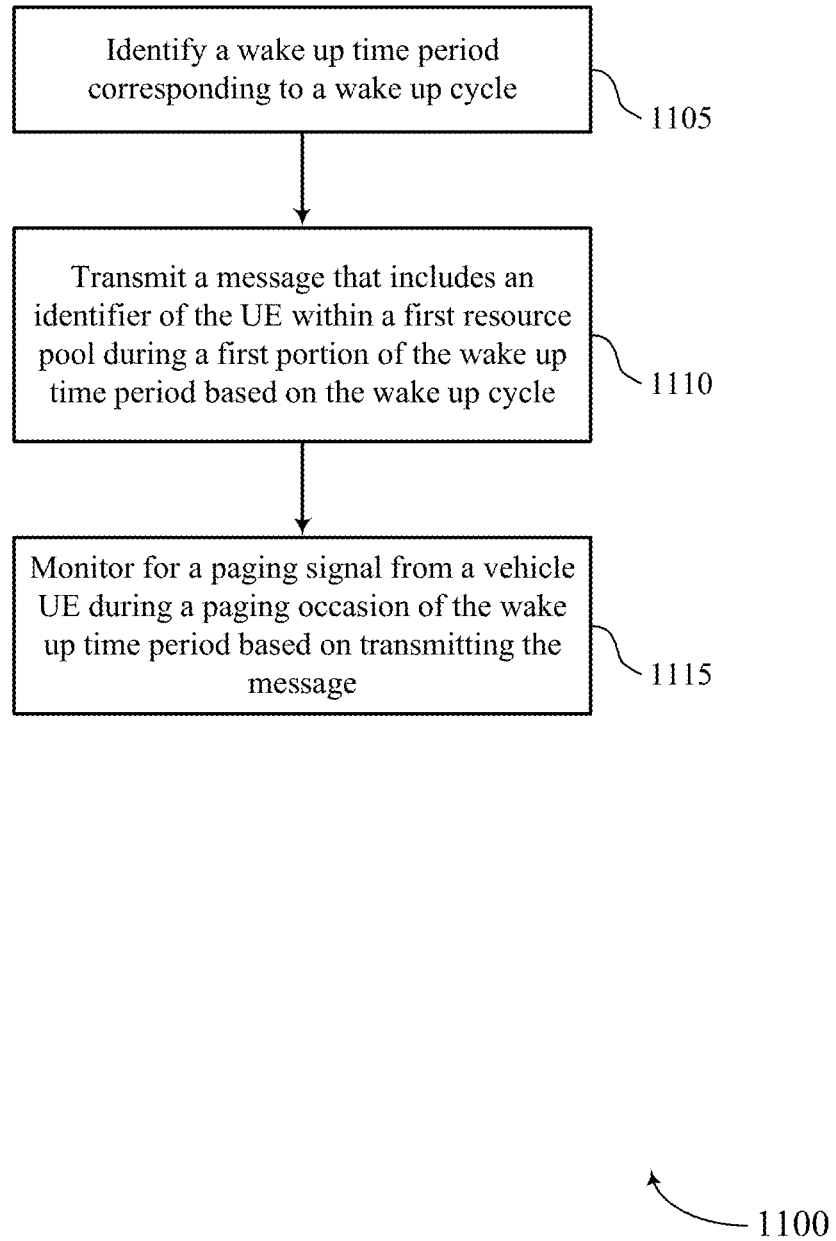
FIGS. 11 through 14 show flowcharts illustrating methods in accordance with aspects of the present disclosure.

FIG. 11 shows a flowchart illustrating a method 1100 in accordance with aspects of the present disclosure. The operations of method 1100 may be implemented by a UE 115 or its components as described herein. For example, the UE 115 may be a P-UE 115 or a V-UE 115. In some examples, the operations of method 1100 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1105, the UE may identify a wake up time period corresponding to a wake up cycle. The operations of 1105 may be performed according to the methods described herein. In some examples, aspects of the operations of 1105 may be performed by a wake up component as described with reference to FIGS. 7 through 10.

At 1110, the UE may transmit a message that includes an identifier of the UE within a first resource pool during a first portion of the wake up time period based on the wake up cycle. The operations of 1110 may be performed according to the methods described herein. In some examples, aspects of the operations of 1110 may be performed by a message component as described with reference to FIGS. 7 through 10.

At 1115, the UE may monitor for a paging signal from a vehicle UE during a paging occasion of the wake up time period based on transmitting the message. The operations of 1115 may be performed according to the methods described herein. In some examples, aspects of the operations of 1115 may be performed by a monitoring component as described with reference to FIGS. 7 through 10.

Figure 12:
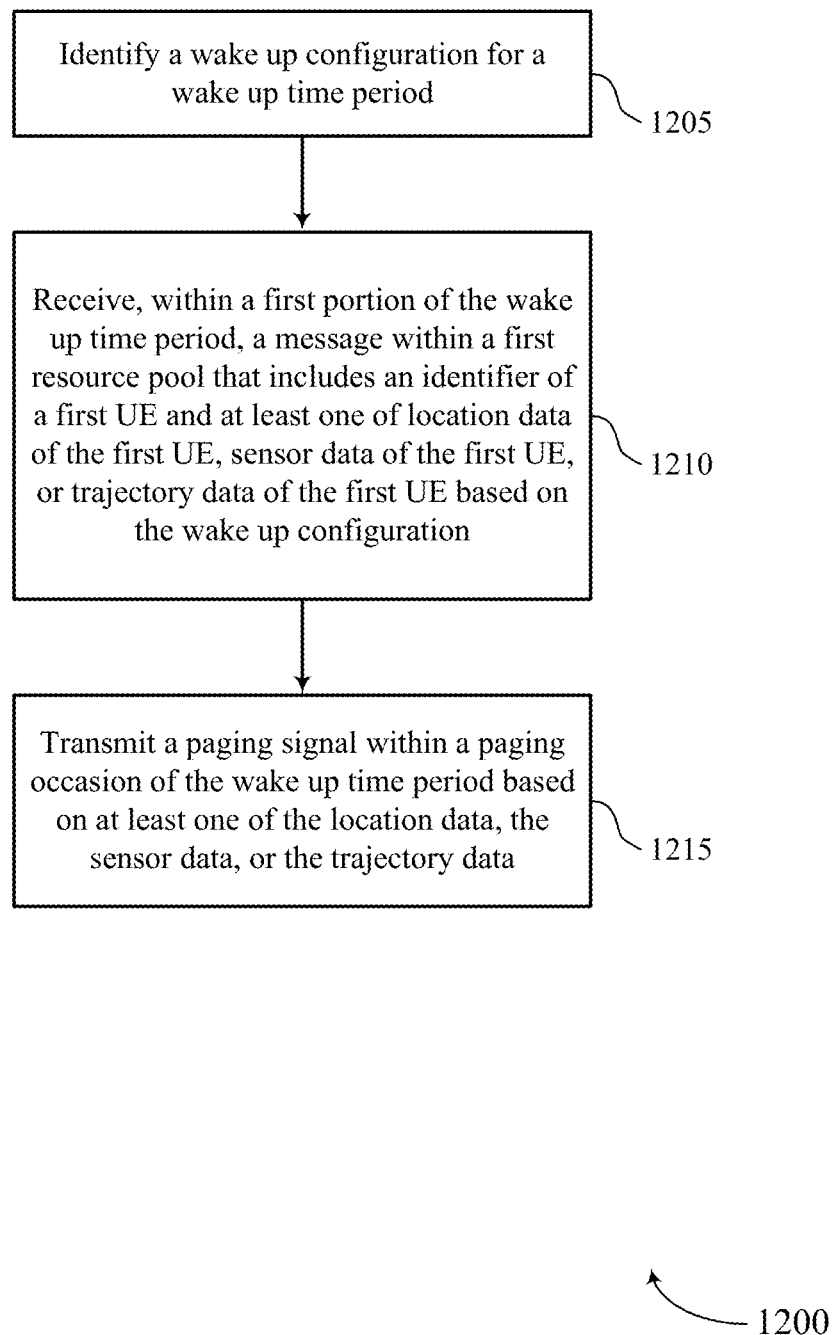

FIG. 12 shows a flowchart illustrating a method 1200 in accordance with aspects of the present disclosure. The operations of method 1200 may be implemented by a UE 115 or its components as described herein. For example, the UE 115 may be a P-UE 115 or a V-UE 115. In some examples, the operations of method 1200 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1205, the UE may identify a wake up configuration for a wake up time period. The operations of 1205 may be performed according to the methods described herein. In some examples, aspects of the operations of 1205 may be performed by a wake up component as described with reference to FIGS. 7 through 10.

At 1210, the UE may receive, within a first portion of the wake up time period, a message within a first resource pool that includes an identifier of a first UE and at least one of location data of the first UE, sensor data of the first UE, or trajectory data of the first UE based on the wake up configuration. The operations of 1210 may be performed according to the methods described herein. In some examples, aspects of the operations of 1210 may be performed by a message component as described with reference to FIGS. 7 through 10.

At 1215, the UE may transmit a paging signal within a paging occasion of the wake up time period based on at least one of the location data, the sensor data, or the trajectory data. The operations of 1215 may be performed according to the methods described herein. In some examples, aspects of the operations of 1215 may be performed by a paging component as described with reference to FIGS. 7 through 10.

Figure 13:
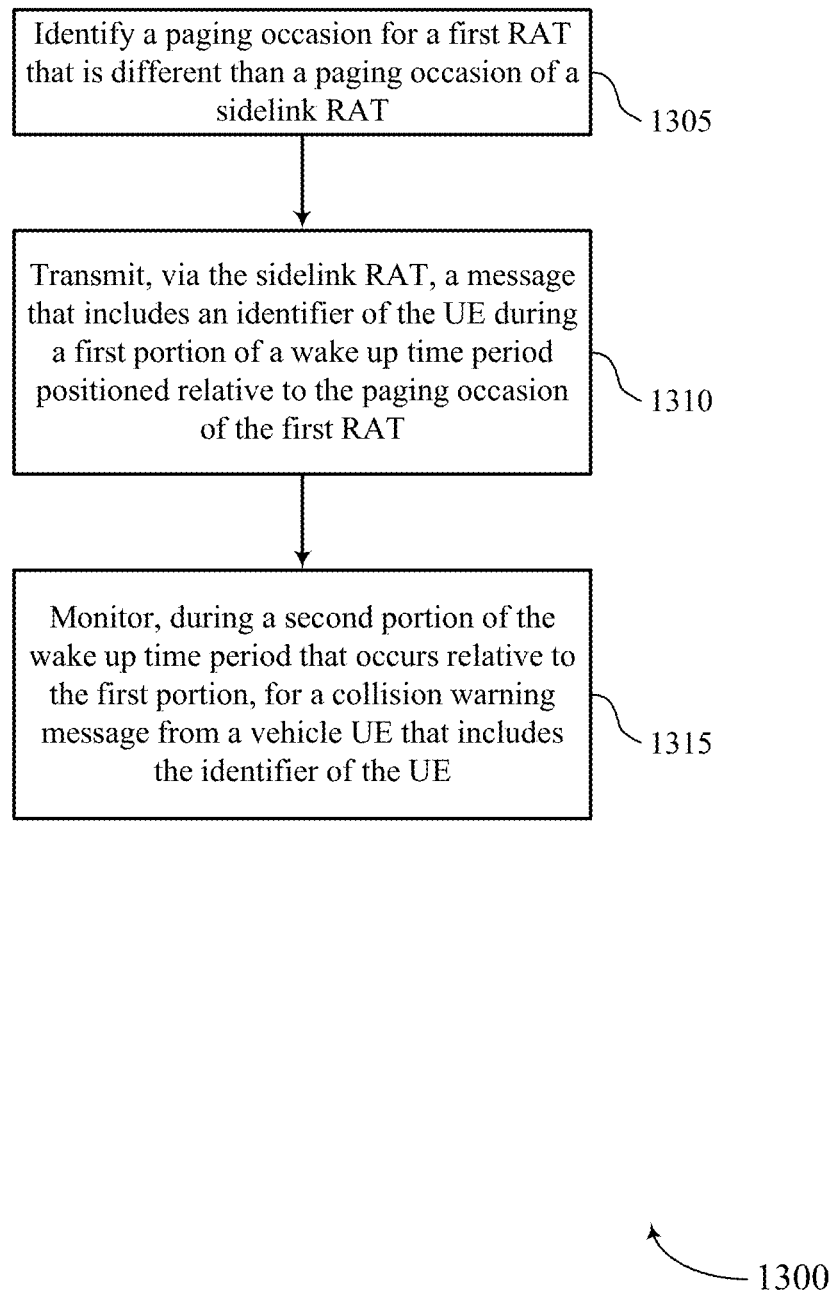

FIG. 13 shows a flowchart illustrating a method 1300 in accordance with aspects of the present disclosure. The operations of method 1300 may be implemented by a UE 115 or its components as described herein. For example, the UE 115 may be a P-UE 115 or a V-UE 115. In some examples, the operations of method 1300 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1305, the UE may identify a paging occasion for a first RAT that is different than a paging occasion of a sidelink RAT. The operations of 1305 may be performed according to the methods described herein. In some examples, aspects of the operations of 1305 may be performed by a paging component as described with reference to FIGS. 7 through 10.

At 1310, the UE may transmit, via the sidelink RAT, a message that includes an identifier of the UE during a first portion of a wake up time period positioned relative to the paging occasion of the first RAT. The operations of 1310 may be performed according to the methods described herein. In some examples, aspects of the operations of 1310 may be performed by a message component as described with reference to FIGS. 7 through 10.

At 1315, the UE may monitor, during a second portion of the wake up time period that occurs relative to the first portion, for a collision warning message from a vehicle UE that includes the identifier of the UE. The operations of 1315 may be performed according to the methods described herein. In some examples, aspects of the operations of 1315 may be performed by a monitoring component as described with reference to FIGS. 7 through 10.

Figure 14:
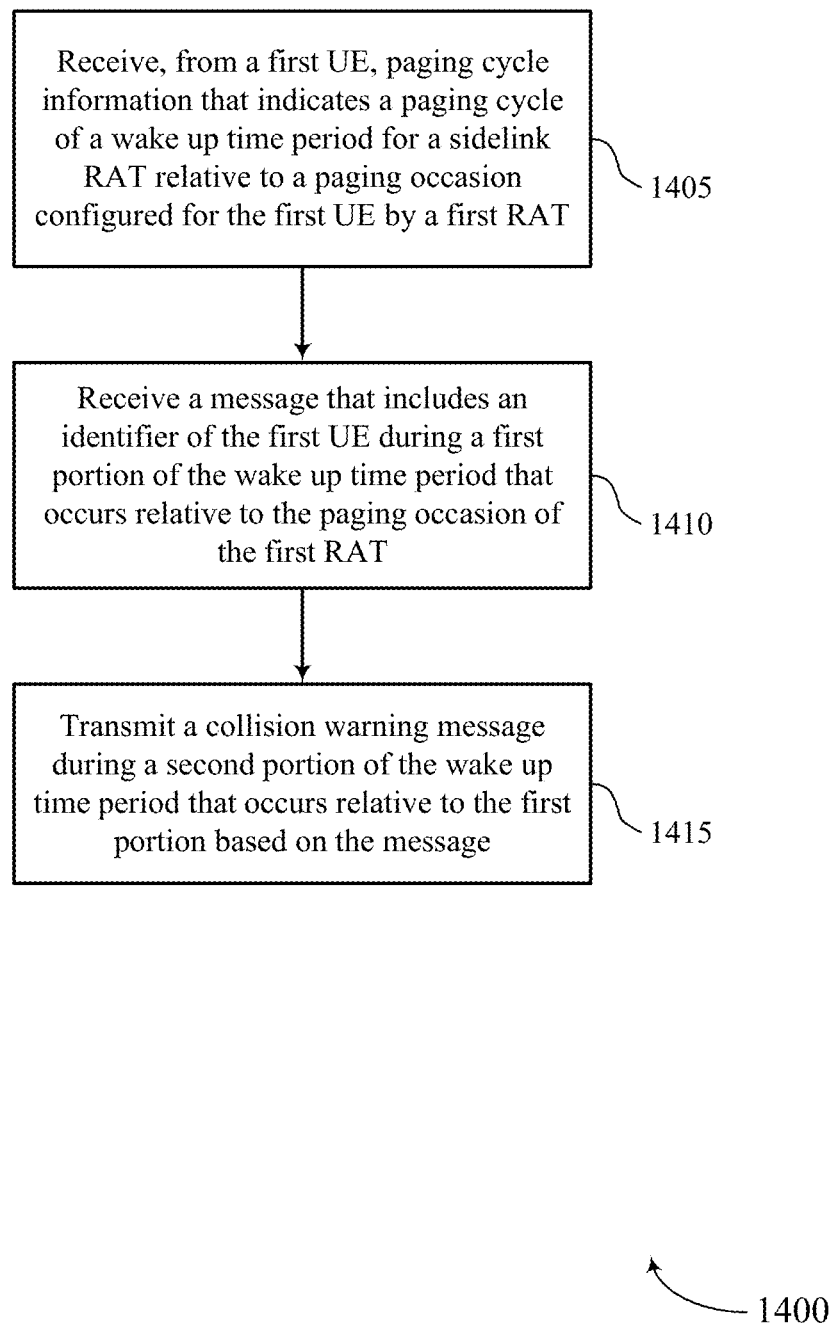

FIG. 14 shows a flowchart illustrating a method 1400 in accordance with aspects of the present disclosure. The operations of method 1400 may be implemented by a UE 115 or its components as described herein. For example, the UE 115 may be a P-UE 115 or a V-UE 115. In some examples, the operations of method 1400 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a first UE, paging cycle information that indicates a paging cycle of a wake up time period for a sidelink RAT relative to a paging occasion configured for the first UE by a first RAT. The operations of 1405 may be performed according to the methods described herein. In some examples, aspects of the operations of 1405 may be performed by a paging component as described with reference to FIGS. 7 through 10.

At 1410, the UE may receive a message that includes an identifier of the first UE during a first portion of the wake up time period that occurs relative to the paging occasion of the first RAT. The operations of 1410 may be performed according to the methods described herein. In some examples, aspects of the operations of 1410 may be performed by a message component as described with reference to FIGS. 7 through 10.

At 1415, the UE may transmit a collision warning message during a second portion of the wake up time period that occurs relative to the first portion based on the message. The operations of 1415 may be performed according to the methods described herein. In some examples, aspects of the operations of 1415 may be performed by a message component as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   identifying a wake up time period corresponding to a wake up cycle;
   transmitting a message that comprises an identifier of the UE within a first resource pool during a first portion of the wake up time period based at least in part on the wake up cycle; and
   monitoring for a paging signal from a vehicle UE during a paging occasion of the wake up time period based at least in part on transmitting the message, wherein a resource of the paging occasion is adjacent in time to a resource of the first resource pool.

2. The method of claim 1, further comprising:
   receiving the paging signal during the paging occasion; and
   monitoring, during a second portion of the wake up time period that occurs relative to the first portion, a second resource pool within the wake up time period for a collision warning message from the vehicle UE based at least in part on receiving the paging signal.

3. The method of claim 2, wherein monitoring the second resource pool comprises:
   receiving the collision warning message that comprises the identifier of the UE; and
   presenting an alert based at least in part on receiving the collision warning message.

4. The method of claim 2, further comprising:
   receiving the collision warning message that comprises an identifier of a second UE that is different than the UE; and
   discarding the collision warning message.

5. The method of claim 2, further comprising:
   entering a low power state beginning after an end of the wake up time period that extends until a subsequent wake up time period.

6. The method of claim 1, further comprising:
   entering a low power state beginning at a second portion of the wake up time period that extends until a subsequent wake up time period based at least in part on determining that the paging signal was not received during the paging occasion within the wake up time period.

7. The method of claim 1, wherein transmitting the message comprises:
   performing a clear channel assessment procedure to determine a resource block for transmission within the first resource pool; and
   transmitting the message within the resource block based at least in part on a result of the clear channel assessment procedure.

8. The method of claim 1, wherein transmitting the message comprises:
   transmitting the message comprising the identifier that is a pseudo identifier of the UE.

9. The method of claim 1, wherein transmitting the message comprises:
   transmitting the message comprising location data of the UE, sensor data of the UE, trajectory data of the UE, or any combination thereof.

10. The method of claim 1, wherein transmitting the message comprises:
    transmitting the message via a sidelink channel using a sidelink interface of the UE.

11. The method of claim 1, wherein identifying the wake up time period comprises:
    receiving a wake up configuration that indicates the wake up time period and the wake up cycle.

12. The method of claim 1, wherein the first portion of the wake up time period occurs before or after a second portion of the wake up time period.

13. A method for wireless communication by a vehicle user equipment (UE), comprising:
    identifying a wake up configuration for a wake up time period;
    receiving, within a first portion of the wake up time period, a message within a first resource pool that comprises an identifier of a first UE and at least one of location data of the first UE, sensor data of the first UE, or trajectory data of the first UE based at least in part on the wake up configuration; and
    transmitting a paging signal within a paging occasion of the wake up time period based at least in part on receiving the message and at least one of the location data, the sensor data, or the trajectory data, wherein a resource of the paging occasion is adjacent in time to a resource of the first resource pool.

14. The method of claim 13, further comprising:
    transmitting or receiving the wake up configuration that indicates a timing reference of the wake up time period, a periodicity of the wake up time period, or both.

15. The method of claim 13, further comprising:
    generating a prediction that the vehicle UE is on a collision course with the first UE based at least in part on the message, wherein the paging signal is transmitted within the paging occasion of the wake up time period based at least in part on the prediction.

16. The method of claim 15, further comprising:
    transmitting a collision warning message comprising the identifier of the first UE within a second resource pool during a second portion of the wake up time period that occurs relative to the paging occasion based at least in part on the prediction.

17. The method of claim 15, further comprising:
    altering a speed of a vehicle that includes the vehicle UE, a trajectory of the vehicle, or both, based at least in part on the prediction.

18. The method of claim 15, further comprising:
    generating an alert based at least in part on the prediction.

19. The method of claim 13, further comprising:
    receiving, within a first portion of a second wake up time period, a second message within a first resource pool that comprises an identifier of a second UE and location data of the second UE;
    generating a prediction that the vehicle UE is not on a collision course with the second UE based at least in part on the second message; and
    determining not to transmit the paging signal within a second paging occasion of the second wake up time period based at least in part on the prediction.

20. The method of claim 13, further comprising:
receiving a plurality of messages that comprises a plurality of identifiers for a plurality of UEs; and
generating a prediction that the vehicle UE is on a collision course with at least one UE of the plurality of UEs based at least in part on the plurality of messages, wherein the paging signal is transmitted within the paging occasion of the wake up time period based at least in part on the prediction.

21. The method of claim 20, further comprising:
transmitting, during a second portion of the wake up time period that occurs relative to the paging occasion, a collision warning message comprising an identifier of the at least one UE based at least in part on the prediction.

22. The method of claim 13, further comprising:
receiving, within a first portion of a second wake up time period, a plurality of messages that comprises a plurality of identifiers for a plurality of UEs;
generating a prediction that the vehicle UE is not on a collision course with any of the plurality of UEs based at least in part on the plurality of messages; and
determining not to transmit the paging signal within a second paging occasion of the second wake up time period based at least in part on the prediction.

23. The method of claim 13, wherein receiving the message comprises:
receiving the message comprising the identifier that is a pseudo identifier of the first UE.

24. The method of claim 13, wherein receiving the message comprises:
receiving the message via a sidelink channel using a sidelink interface of the first UE.

25. The method of claim 13, wherein the first portion of the wake up time period occurs before or after a second portion of the wake up time period.

26. A method for wireless communications by a user equipment (UE), comprising:
identifying a paging occasion for a first radio access technology (RAT) that is different than a paging occasion of a sidelink RAT;
transmitting, via the sidelink RAT, a message that comprises an identifier of the UE during a first portion of a wake up time period positioned relative to the paging occasion of the first RAT; and
monitoring, during a second portion of the wake up time period that occurs relative to the first portion and based at least in part on transmitting the message that comprises the identifier of the UE, for a collision warning message from a vehicle UE that comprises the identifier of the UE, wherein a resource of the first portion is adjacent in time to a resource of the second portion.

27. The method of claim 26, further comprising:
transmitting paging cycle information that indicates a paging cycle of the wake up time period.

28. The method of claim 26, wherein transmitting the message comprises:
transmitting the message comprising a location data of the UE, trajectory data of the UE, sensor data of the UE, or any combination thereof.

29. A method for wireless communications by a vehicle user equipment (UE), comprising:
receiving, from a first UE, paging cycle information that indicates a paging cycle of a wake up time period for a sidelink radio access technology (RAT) relative to a paging occasion configured for the first UE by a first RAT;
receiving a message that comprises an identifier of the first UE during a first portion of the wake up time period that occurs relative to the paging occasion of the first RAT; and
transmitting, based at least in part on the message, a collision warning message during a second portion of the wake up time period that occurs relative to the first portion, wherein a resource of the first portion is adjacent in time to a resource of the second portion.

30. The method of claim 29, wherein receiving the message comprises:
receiving the message comprising a location data of the first UE, trajectory data of the first UE, sensor data of the first UE, or any combination.

* * * * *